Jan. 23, 1962     D. R. SNOWDON ETAL     3,018,036
PERFORATING APPARATUS
Filed Sept. 14, 1960     9 Sheets-Sheet 1
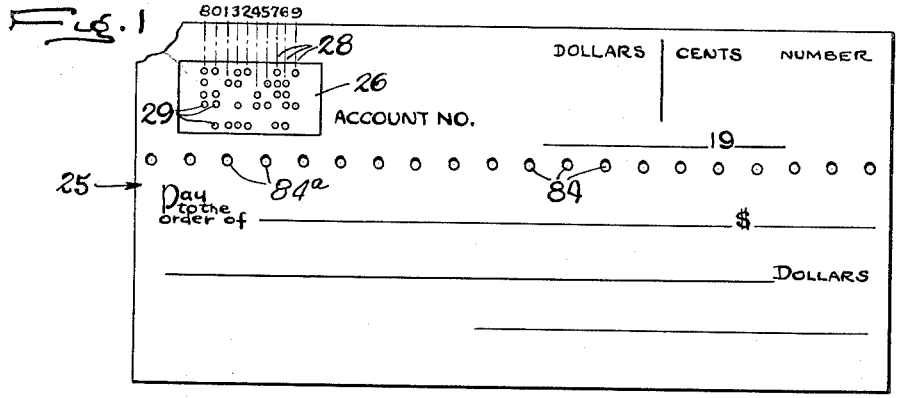
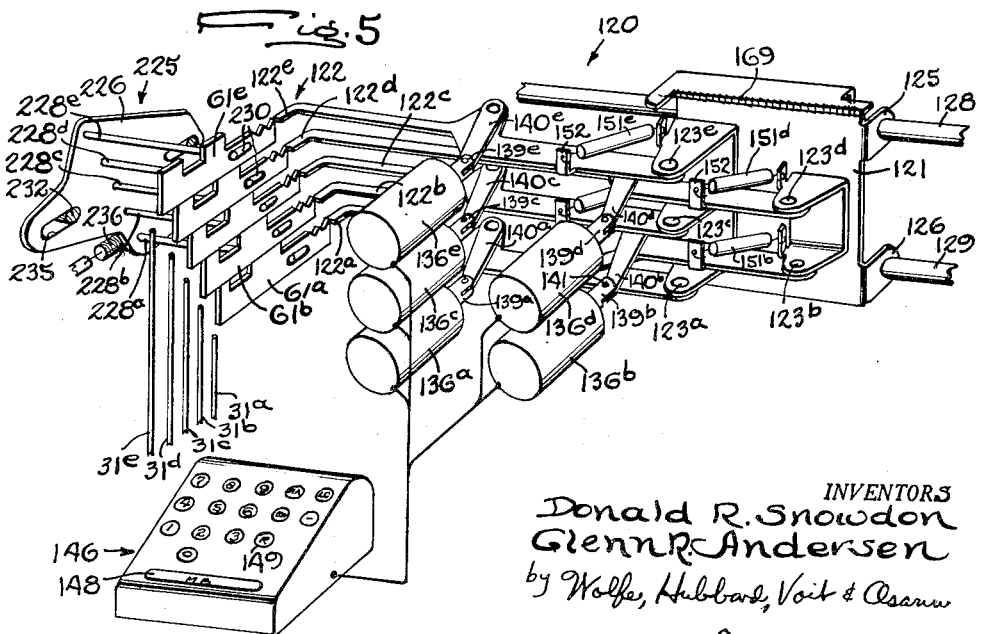
INVENTORS
Donald R. Snowdon
Glenn R. Andersen
by Wolfe, Hubbard, Voit & Osann
ATTORNEYS Jan. 23, 1962 D. R. SNOWDON ETAL 3,018,036
PERFORATING APPARATUS
Filed Sept. 14, 1960 9 Sheets-Sheet 2

INVENTORS
Donald R. Snowdon
Glenn R. Andersen
by Wolfe, Hubbard, Voit & Osann
ATTORNEYS

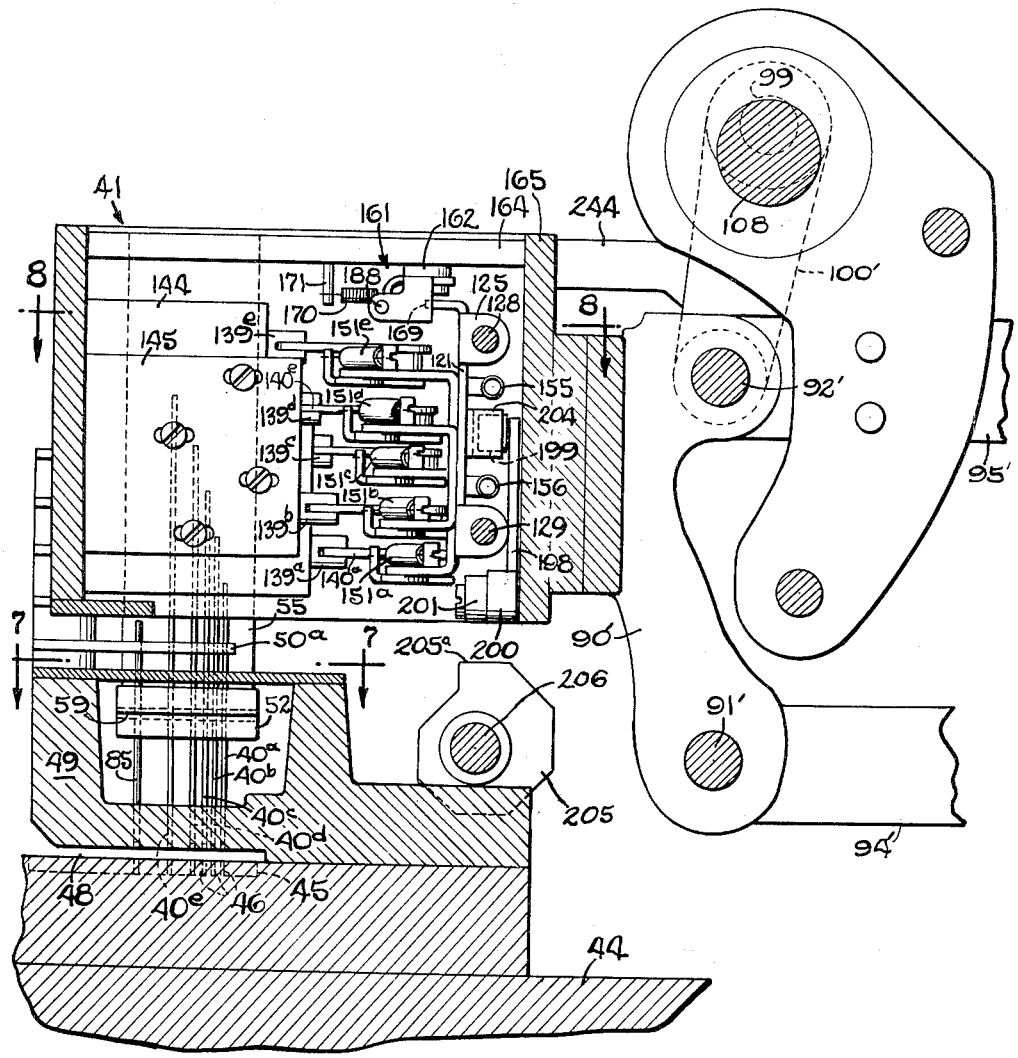

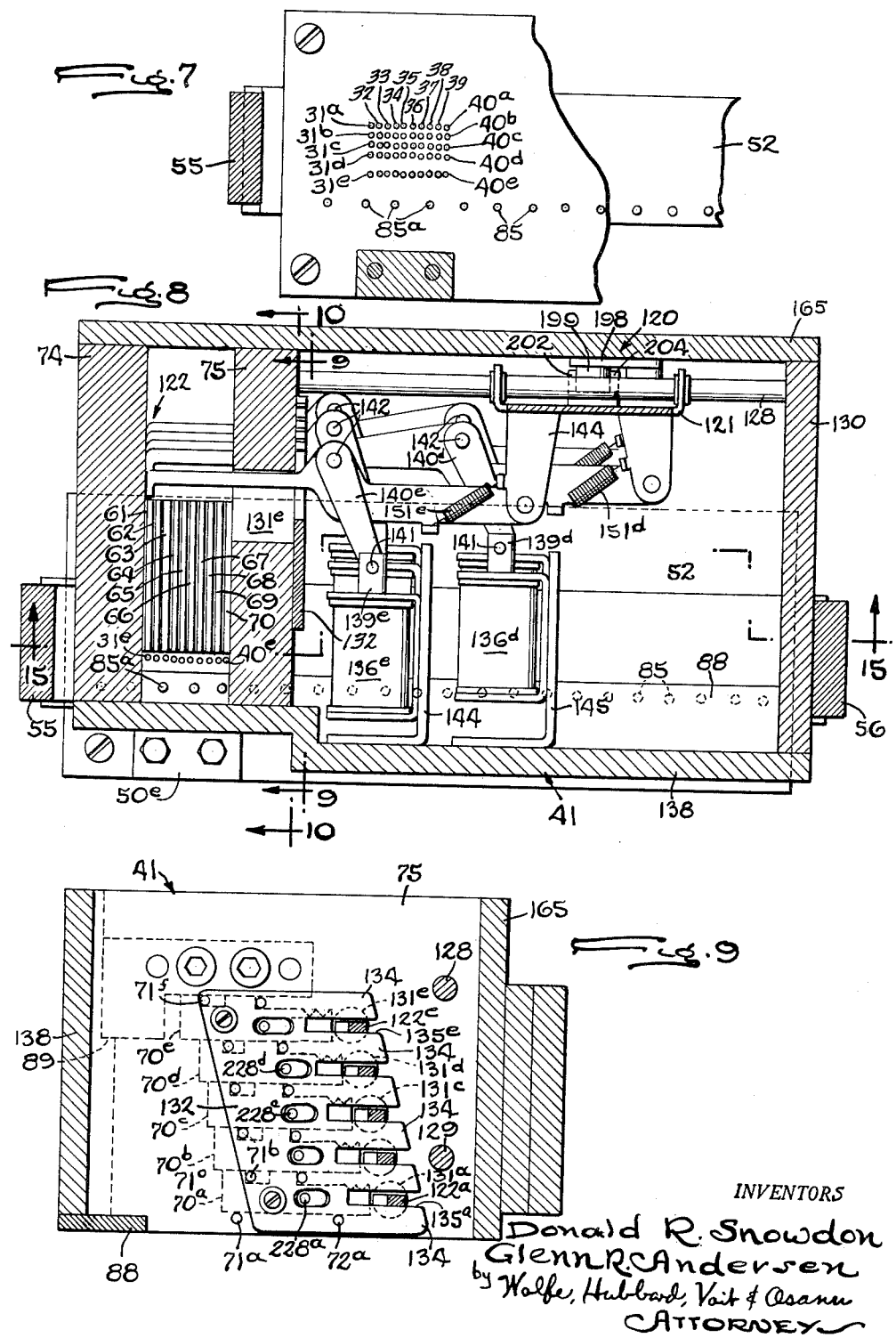

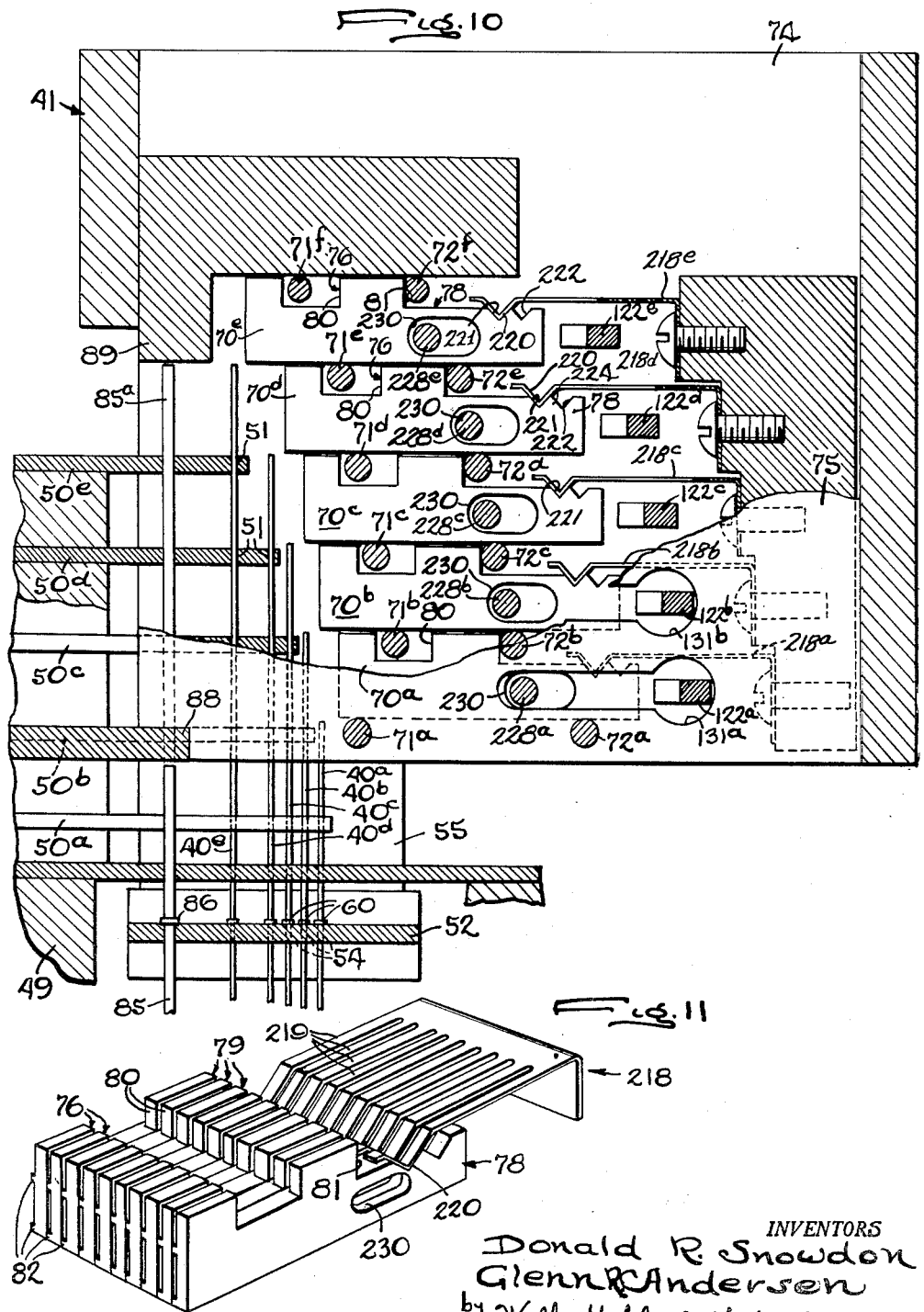

Jan. 23, 1962 D. R. SNOWDON ETAL 3,018,036
PERFORATING APPARATUS
Filed Sept. 14, 1960 9 Sheets-Sheet 6
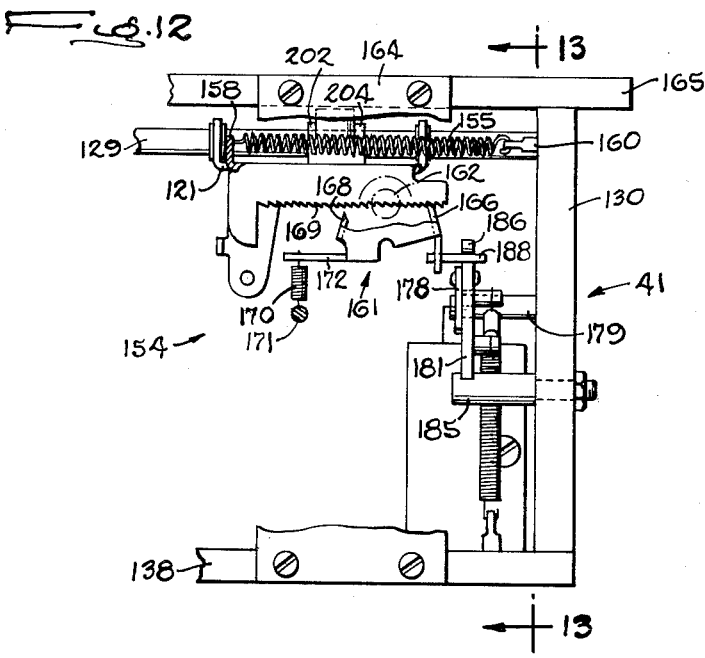
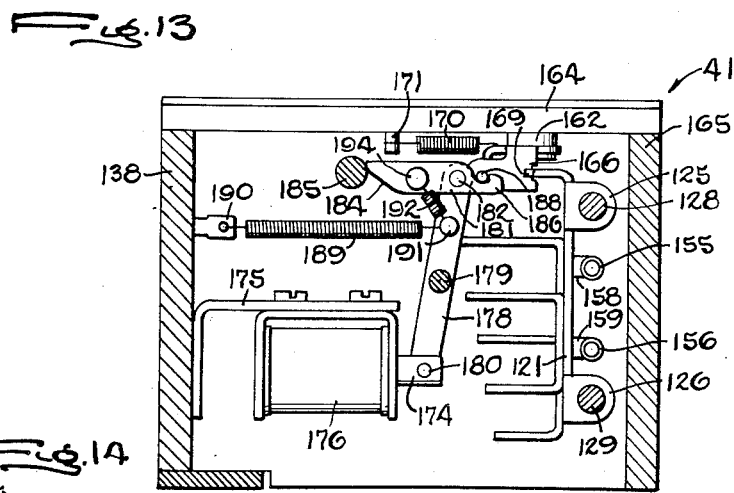
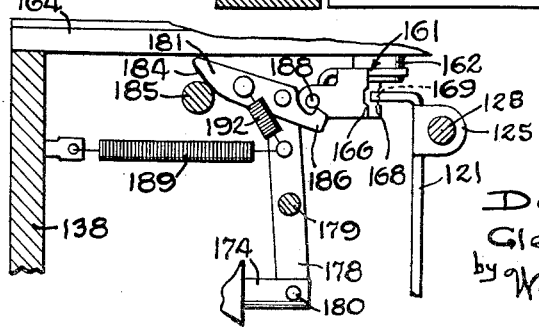
INVENTORS
Donald R. Snowdon
Glenn R. Andersen
by Wolfe, Hubbard, Voit & Osann
ATTORNEY

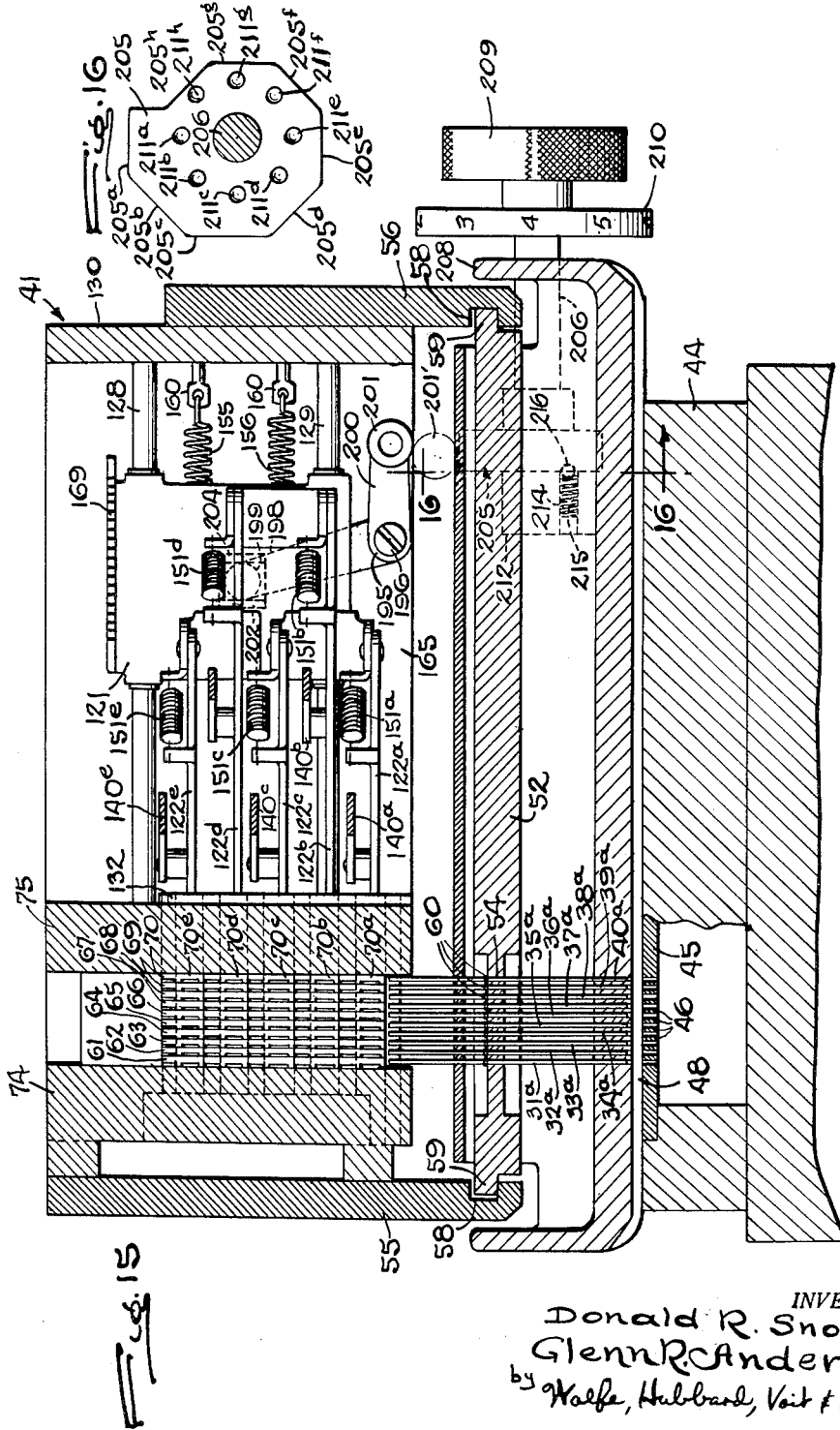

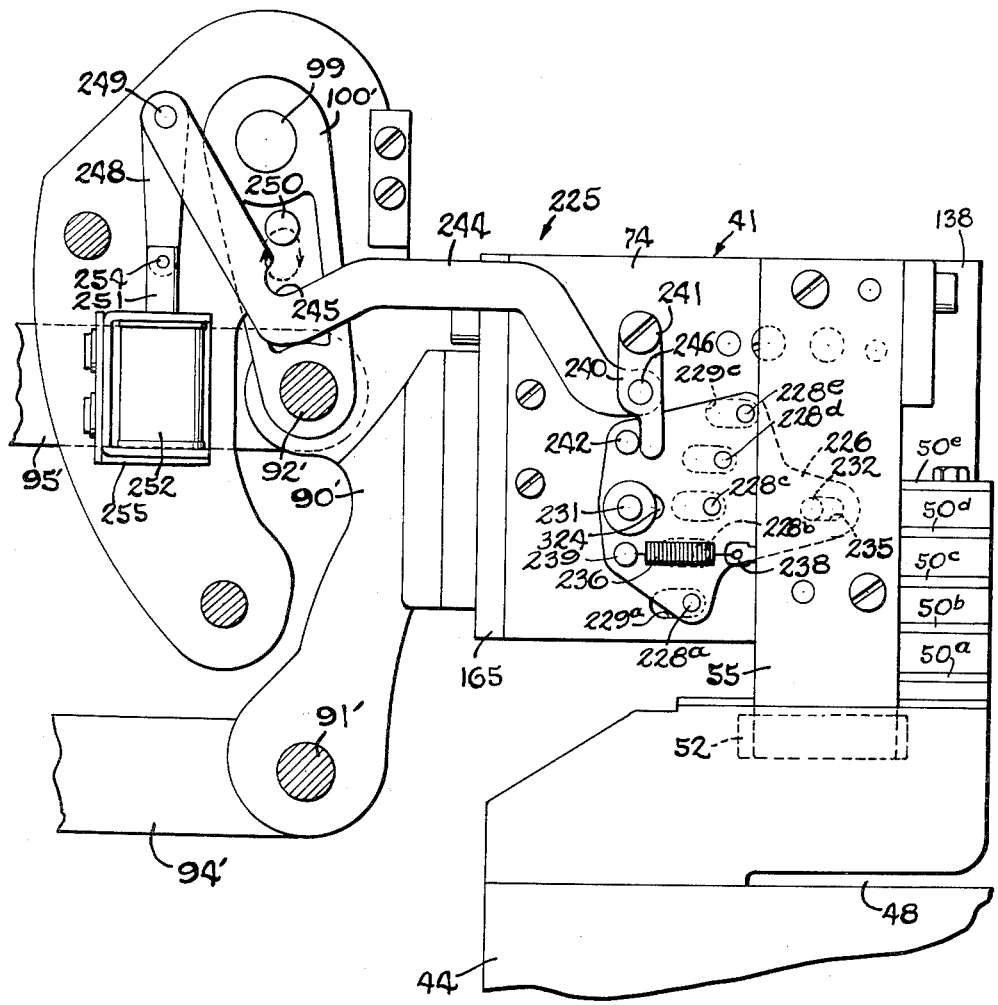

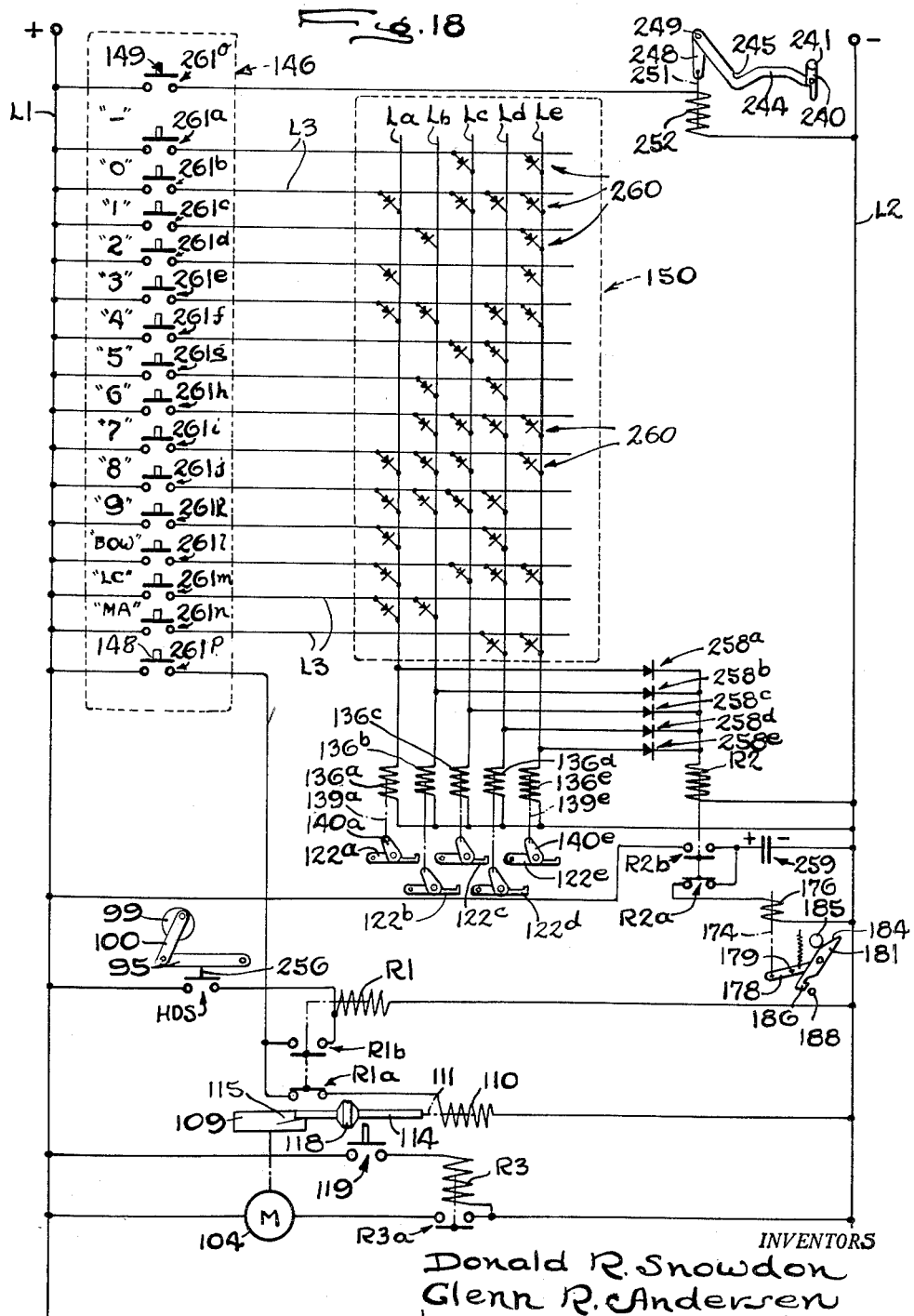

United States Patent Office 3,018,036
Patented Jan. 23, 1962

3,018,036
PERFORATING APPARATUS
Donald R. Snowdon and Glenn R. Andersen, Chicago, Ill., assignors to Cummins-Chicago Corp., Chicago, Ill., a corporation of Illinois
Filed Sept. 14, 1960, Ser. No. 55,947
33 Claims. (Cl. 234—111)

The present invention relates to apparatus for producing a predetermined pattern of perforations in an account book, checkbook or other documents and, more particularly, to perforating apparatus which may be quickly and conveniently set up to perforate holes representing different characters or combinations of characters.

It is a general object of the present invention to provide improved apparatus for producing a perforation field. It is a related object of this invention to provide a highly versatile perforating machine which perforates patterns of holes representing any desired number of selected characters.

A more specific object of the invention is to provide perforating apparatus in which a plurality of punches may be simultaneously conditioned to perforate any desired character by the simple expedient of selecting the character on a keyboard, thus promoting rapidity of operation.

More particularly stated, it is an object of the invention to provide a perforating head which is of compact organization, requiring only a single set of punch-selecting actuators to operate, successively, a plurality of rows of punch interposers.

It is another object of the invention to provide perforating apparatus which simultaneously applies a plurality of coded characters to a document in response to successive signals received from a keyboard or the like, each signal designating one of the characters. A related object of the invention is to provide such perforating apparatus which may be easily operated by unskilled and untrained personnel.

A further object of this invention is to provide perforating apparatus having an automatic blocking interposer clearing mechanism for affirmatively returning the interposers to a nonperforating position incident to the operation of the machine together with apparatus for selectively incapacitating the interposer clearing mechanism.

It is a related object of the invention to provide perforating apparatus in which the same plurality of characters may be perforated in successive documents without having to reset the interposers.

More specifically, it is an object of the invention to provide portable perforating apparatus which includes a manually adjusted digit selector for automatically effecting return of the punch selecting actuators to any desired digit position incident to the perforation of the document.

These and other objects and advantages of the invention are attained by the construction and arrangement shown as an exemplary embodiment in the accompanying drawings, in which:

FIG. 1 illustrates a typical check having coded indicia applied thereto in the form of a rectangular field of closely spaced perforations;

FIG. 2 is a chart disclosing a typical perforation code;

FIG. 5 is a simplified view of a portion of the perforating head disclosing particularly the interrelationships of the punches, interposers and hammers;

FIG. 6 is a fragmentary vertical section illustrating the perforating head, but with certain components omitted for purposes of clarity;

FIG. 7 is a fragmentary detail view taken substantially along the line 7—7 of FIG. 6 and illustrating the rectangular disposition of the elongated perforating punches;

FIG. 8 is a horizontal section taken substantially along the line 8—8 of FIG. 6 and disclosing the interposer hammers together with their supporting and translating means; portions thereof being omitted for purposes of clarity;

FIG. 9 is a sectional view taken substantially along the line 9—9 of FIG. 8 illustrating the supporting means utilized for retaining the actuating hammers in the desired spaced relation;

FIG. 10 is an enlarged fragmentary sectional view taken substantially along the line 10—10 of FIG. 8 and partly broken away to illustrate the stepped arrangement of punches, interposers and supporting shelves;

FIG. 11 is a perspective view illustrating one level of interposers, together with the spring detent means employed for retaining the interposers in the selected positions;

FIG. 12 is a fragmentary plan view of a portion of the perforating head, partly broken away to illustrate the escapement mechanism employed for effecting incremental movement of the hammers;

FIG. 13 is a vertical section taken substantially along line 13—13 of FIG. 12 and illustrating the escapement solenoid in its energized position;

FIG. 14 is a fragmentary section similar to FIG. 13 and illustrating the escapement solenoid in its de-energized condition;

FIG. 15 is a fragmentary section, taken substantially along the offset line 15—15 of FIG. 8 and illustrating the detented digit selector;

FIG. 16 is a detail view taken substantially along the line 16—16 of FIG. 15;

FIG. 17 is a fragmentary elevation taken partly in section from the left side of the perforating machine, illustrating the mechanism for selectively returning the blocking interposers to a nonblocking position subsequent to a perforating operation; and FIG. 18 is a schematic wiring diagram of the electric controls for the perforating apparatus.

Figure 3:
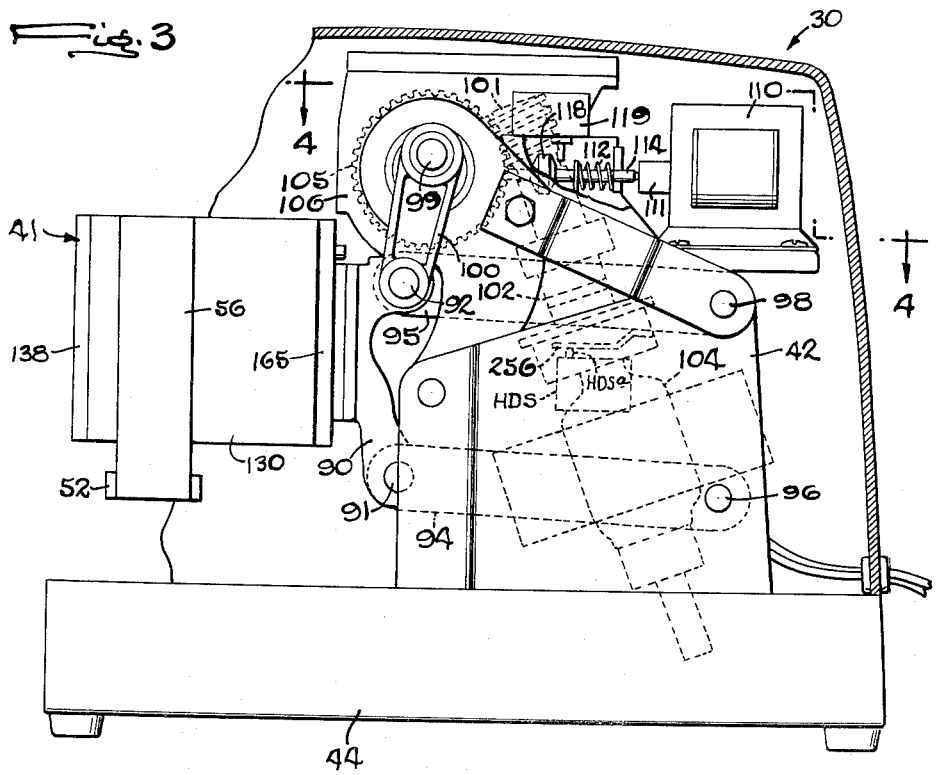
FIG. 3 is a fragmentary side view, partly in section, disclosing the motor mounting employed for effecting relative movement between a perforation head embodying the features of the present invention and the supporting base.

While the invention has been illustrated and will be described in detail with reference to a preferred embodiment thereof, there is no intention that it thus be limited to such detail. On the contrary, it is intended here to cover all equivalent and alternative constructions which fall within the spirit and scope of the invention defined by the appended claims.

Referring now to FIG. 1, a typical business document 25 here shown as a check is of conventional form with respect to the printed information appearing thereon, but also includes accounting information or the like in the form of a field 26 of character-representing indicia. Such indicia, preferably representing characters according to a predetermined code, has proven to be of great value in modern business practices, particularly since it may conveniently be "read" by automatic business machines such as sorters, posting machines, computers and the like. This rapid and accurate mechanized handling of such documents, and processing of information thereon, is known popularly as "office automation." In the exemplary document 25, the field 26 is in the form of a plurality of rows 28 of closely spaced perforations 29, each row by the combination of vertically spaced holes therein representing a particular numeral or character.

The individual characters are represented on the check 25 by each row 28 of perforations 29, the perforations being arbitrarily located in each row to conform with any selected code system. For example, in the in-line five place code shown in FIG. 2, the characters "0" through "9," "-," "BOW," "LC" and "NA" may be represented by perforations located in different combinations of levels, there being five such levels A through E. Thus, to represent the character "8" for example, it is merely necessary that perforations 29 be located at levels A, B, C and D within a single row 28. It will be apparent that the pattern of in-line perforations in the successive rows 28 in the illustrative check 25 represent the digits in the number "8013245769," as labelled in FIG. 1.

Since each character is denoted by a predetermined combination of perforations at each level A through E in a single row 28, the information applied to a particular document may be rapidly "read" by appropriate reading equipment that is responsive to the presence or absence of a perforation at each station in the field 26. Such equipment will identify each individual character and supply an appropriate signal to a sorter, data processor, or the like.

It will be appreciated that coded indicia in the form of a field of closely spaced perforations located at selected stations in a rectangular array has particular utility in business documents of the type wherein it is desired to encode the same characters on a plurality of documents simultaneously. For example, such a perforation field may be simultaneously applied to each of the checks in a checkbook simply by driving selected punches through the checkbook.

The present invention is concerned primarily with an improved apparatus for applying indicia to a business document, such as a book of checks 25, to represent characters in an in-line code.

In carrying out the present invention, means are provided for simultaneously producing perforations at selected stations in a compact rectangular array of rows and levels in a document. For this purpose, a plurality of punches (FIG. 6) are arranged in a rectangular array in a perforating apparatus 30 (FIG. 7). In the preferred form of the invention the punches are arranged in ten vertical rows 31–40, there being five punches for the respective levels in each row designated by the respective reference characters 31a–31e through 40a–40e, and corresponding to the levels A—E illustrated in the exemplary code system of FIG. 2. The punches are elongated in shape and are mounted with freedom for independent end-wise movement in a perforating head 41. As will be described with greater particularity below, the perforating head 41 is mounted on a frame 42 (FIG. 3) carried by the base 44 of the perforating apparatus 30 in such a manner as to have freedom for relative movement towards and away from the base 44 (FIG. 3).

To produce perforations in a particular article such as a checkbook, the lower ends of each of the punches in the rectangular array are adapted to be passed selectively through the document during relative closing movement between the perforating head 41 and the base 44. A die block 45 (FIGS. 6 and 15), having a plurality of punch receiving openings 46 arranged in a rectangular array corresponding with the rectangular array of punches is mounted on the base 44—the die block 45 being spaced from the punch plane defined by the lower tips of the punches by a transverse slot 48 formed in the base 44 to receive the article to be perforated. When the article to be perforated, for example, a book of checks 25, is fully inserted into the slot 48 it underlies the lower ends of the punches and is perforated by those punches which are affirmatively moved into their associated punch receiving openings 46 in the die block 45 when relative closing movement between the perforating head 41 and die block 45 occurs.

For maintaining the rows of punches 31–40 properly oriented with respect to the rectangular array of punch receiving openings 46 in the die block 45, the base 44 of the perforating apparatus 30 is provided with an upstanding frame 49 on which are mounted a plurality of parallel, vertically spaced, horizontal shelves 50, there being five such shelves 50a–50e in the illustrative embodiment. The shelves 50a–50e are progressively shorter in length (FIG. 10) so as to form a vertically stepped configuration. The longest shelf 50a is lowermost and the shortest shelf 50e is uppermost. Each of the shelves 50 are provided with a plurality of openings 51 through which the rows of punches 31–40 slideably extend.

It will be appreciated that the punches in each row (for example, row 40) are stepped in length with the rearmost punch 40a (the punch on the right as viewed in FIG. 10) being the shortest and punch 40e being the longest. Since the configuration of punches in all of the rows 31–40 is the same, the following discussion will be made in connection with row 40, it being understood that the description is also applicable to every other row. As is clearly illustrated in FIG. 10, the shortest punch 40a slideably extends upwardly through and terminates above an opening 51 in the longest shelf 50a. The next shortest punch 40b slideably extends through the openings 51 in both the shelves 50a and 50b, terminating above the latter shelf. In like manner, each successively longer punch slideably extends through the openings 51 in the next higher shelf so that the stepped configurations of shelves and punches substantially conform to one another.

In order to support the punches in each row 31–40 in the perforating head 41 with freedom for independent end-wise movement relative to the head while simultaneously providing for affirmative withdrawal of the punches from a perforated article subsequent to a perforating operation, the perforating head is provided with a transverse stripper plate 52 having a rectangular array of openings 54 formed therein positioned to slideably receive the punches (FIG. 10). For rigidly supporting the stripper plate 52 on the perforating head 41 a pair of downwardly extending side plates 55, 56 are secured to the opposite sides of the head 41 (FIG. 15). Undercut grooves 58 in the side plates 55, 56 receive and support a rib 59 formed on the ends of the stripper plate 52. Each punch (for example, punches 40a–40e as viewed in FIG. 10) is provided with an enlarged knob or stop 60 positioned intermediate the ends of the punch so as to normally rest upon the stripper plate 52. Each stop 60 is dimensioned so as to prevent the associated punch from falling through the opening 54 in the stripper plate 52, thus retaining each punch within the perforating head. As will later be described with greater particularity, the stripper plate 52, through co-action with the stops 60, serves to affirmatively withdraw each punch that has perforated a document disposed on the die block 45.

To drive selected combinations of punches in each row 31—40 through a book of checks 25 to form a plurality of perforated characters thereon, a plurality of blocking interposers are mounted in the perforating head 41 in adjacent vertical rows 61–70 (FIGS. 8 and 15), the rows of interposers 61–70 corresponding to the rows of punches 31–40 respectively. Referring to FIG. 10, it will be seen that in each row (for example, row 70), the five interposers 70a–70e are stepped in length to conform to the stepped configuration of punches 40a–40e, there being one interposer associated with each punch.

For allowing selective positioning of each interposer in blocking position over its associated punch, the interposers in the exemplary embodiment are mounted in the perforating head 41 with freedom for limited end-wise movement in a horizontal plane. To this end, a plurality of transverse supporting rods 71, 72 are rigidly mounted at their opposite ends in side frames 74, 75 integral with the perforating head 41. Thus, the bottom level of interposers 61a–70a are slideably supported by rods 71a, 72a while the next level of interposers 61b–70b are slideably supported by rods 71b, 72b. It will be apparent that each higher level of interposers is supported in like manner by the underlying support rods 71, 72. An additional pair of transverse support rods 71f, 72f are rigidly mounted on the perforating head 41 in a position to overlie the uppermost level of interposers 61e–70e for a purpose to be described below.

To accommodate each of the supporting rods 71b–71f, while at the same time providing freedom for limited end-wise movement of the interposers, The latter are formed with transverse slots 76 through which the transverse supporting rod 71 for the next higher level of interposers extends. Each interposer includes a rearwardly extending portion 78 defining with the next higher interposer a transverse slot 79 through which the transverse supporting rod 72 for the next higher level of interposers extends. It will thus be apparent that all the level A interposers (for example, interposer 70a) are supported by rods 71a and 72a with freedom for end-wise movement into a blocking position over their associated punches. Moreover, it will be appreciated that the amount of forward movement of each interposer is positively limited by abutment of the rearward wall 80 of its transverse slot 76 with the transverse supporting rod 71. Thus, each interposer may be selectively moved forward into blocking position over its associated punch, but is at the same time prevented from being driven into the punch associated with the interposer immediately above. In like manner, the amount of rearward movement of each interposer is positively limited by abutment of the forward wall 81 of its transverse slot 79 with the transverse supporting rod 72. As the description proceeds, it will be apparent that the foregoing stops provided by supporting rods 71 and 72 form secondary safety features since additional means are provided for limiting movement of the interposers.

In order to insure smooth operation and to permit each interposer to be selectively driven forward independently of adjacent interposers, means are provided eliminating any tendency for a forwardly moving interposer to frictionally drag an adjacent interposer. Preferably, this is accomplished by dimensioning the interposers so that each level is slightly spaced—on the order of .005 inch—from the level thereabove. Additionally, each interposer may be formed with a generally inverted F-shaped cross section (FIG. 11) so as to provide a pair of laterally extending ribs 82 on one side of each interposer. As is clearly illustrated in FIG. 11, the interposers in any one level are placed adjacent one another with only the lateral projections 82 on one interposer in abutment with the adjacent interposer, thus effectively eliminating any tendency for one interposer to drag the adjacent interposer forward through frictional engagement.

In keeping with the invention, means are provided for simultaneously perforating a plurality of sprocket holes 84 (FIG. 1) in each check 25 or like document, which holes serve to facilitate handling of independent documents by automatic reading and data processing equipment. To accomplish this, a plurality of elongated punches 85 (FIGS. 7 and 10), each having a stop 86 similar to the stop 60 on the stepped punches, are carried by the perforating head 41 and the stripper plate 52 with freedom for endwise movement. Unlike the rows of punches 31–40 which are confined to a compact area corresponding to the perforation field 26 on the check 25, the sprocket hole punches are spaced at equal intervals across the entire width of the perforating head 41 so as to form equally spaced sprocket holes 84 extending from one end of the check 25 to the other. Each of the sprocket punches 85, with the exception of those punches 85a positioned to form the sprocket holes 84a (FIG. 1) in the check 25 immediately below the perforating field 26, terminates at its upper end immediately beneath a transverse plate 88 (FIG. 10) formed integral with the perforating head 41. The sprocket hole punches 85a (FIG. 10) positioned to form the sprocket holes 84a immediately below the perforating field 26 are substantially longer than the remaining sprocket hole punches 85, terminating at their upper ends directly beneath an L-shaped spacer element 89 which is rigidly mounted on the perforating head 41 between the side frames 74, 75.

To simultaneously produce indicia in the form of a perforated field, the five levels of interposers in each row 61–70 are selectively shifted in accordance with the exemplary in-line code system of FIG. 2, and the perforating head 41 lowered toward the document to be perforated. As the head 41 closes relative to the document, the L-shaped spacer 89 engages both the upper level of interposers 61e–70e and the elongated sprocket hole punches 85a. Simultaneously, the transverse plate 88 on the perforating head 41 engages all of the shorter sprocket hole punches 85. Upon further relative closing movement, all of the sprocket punches 85 and those of the perforating punches having an interposer positioned thereover in blocking position, are driven through the document and into the punch receiving openings 46 in the die plate. Those punches corresponding to unshifted interposers, i.e., interposers which are in the retracted position shown by FIG. 10, are not blocked at their upper ends, and so they slide upwardly in the guides 50a–50e when their lower ends engage the document. Such unblocked interposers do not punch holes in the document.

Figure 4:
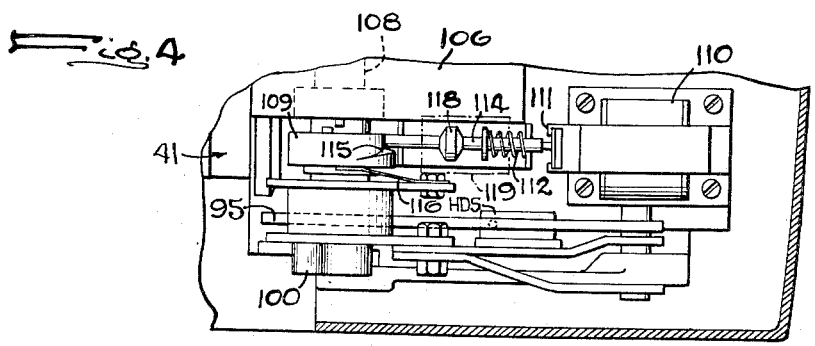
FIG. 4 is a fragmentary section taken substantially along the line 4—4 of FIG. 3, illustrating the mechanism employed for limiting operation to a single operating cycle.

To produce this relative closing movement of the perforating head, and consequently selected combinations of punches in each row of punches 31–40, with respect to the article being perforated, provision is made for reciprocating the entire head downwardly and upwardly relative to the base 44 of the perforating apparatus 30. To this end, the head 41 is rigidly mounted on a slide 90 (FIG. 3) which is supported by a pair of pins 91, 92 carried at the forward end of a pair of parallel links 94, 95 respectively. The opposite ends of the links are respectively journaled on pintles 96, 98 carried by the frame of the machine. The support of the perforating head 41 provided by the parallel links 94, 95 assures that the head reciprocates up and down with a linear motion as an eccentric shaft 99 coupled by a pitman 100 to the link 95 executes one complete revolution. A worm gear 101 on the output shaft 102 of an electric motor 104 is meshed with a worm wheel 105 which is connected through a suitable input shaft to a speed reducing gear box 106. As best illustrated in FIG. 4, the output shaft 108 of the gear box forms the driving member of a one revolution clutch having a driven member 109 coupled directly to the eccentric shaft 99. Thus, when the driving member 108 and the driven member 109 of the one revolution clutch are coupled together, the eccentric shaft 99 is driven by the motor 104 through the speed reducing gearing. Rotation of the shaft 99 imparts lineal vertical reciprocation to the perforating head 41 through the pitman 100 and the parallel links 94, 95.

For insuring that the perforating head 41 will move through only one cycle of vertical reciprocation, a clutch control solenoid 110, mounted on the frame of the perforating apparatus 30, is energized to retract its armature 111 against the bias of a spring 112. The armature 111 is rigidly connected to a clutch actuating pin 114, the opposite end of which is normally in abutment with a cam track 115 formed in the driven member 109. Accordingly, when the armature 111 is retracted against the bias of the spring 112, the pin 114 is withdrawn from abutment with the cam track 115 and the driven member 109 of the one revolution clutch is urged into coupled relationship with the driving member 108 by means of a leaf spring 116 or the like. As will be described with greater particularity in connection with the control circuitry, means are provided for only momentarily energizing the solenoid 110. The bias provided by the spring 112 tends to urge the pin 114 back into engagement with the cam track 115 when the solenoid is de-energized, thus tending to uncouple the driving and driven clutch members. Retraction of the armature 111 also shifts a cam 118 inwardly (FIG. 3), thereby actuating a motor control switch 119, the latter being de-actuated as the eccentric shaft 99 completes one full revolution and the pin 114 snaps back into its original position in the cam track 115, thereby uncoupling the driving and driven members.

In accordance with one of the important aspects of the present invention, positioning apparatus is provided for independently driving selected interposers in any one row of interposers into a blocking position over their associated punches, and for translating the positioning apparatus with respect to the perforating head so as to selectively position interposers in each row successively. To this end, the positioning apparatus includes a row of interposer actuators pivotally mounted on a carriage supported by and translatable along the perforating head. FIGS. 5 and 8, best illustrate the positioning apparatus, generally indicated at 120, for selectively positioning each interposer in any one row, for example, interposers 61a–61e in row 61. The positioning apparatus 120 includes a carriage 121 mounting a plurality of elongated hammers arranged in a row 122, there being five such hammers 122a–122e. As is clearly illustrated in FIG. 5, each hammer 122a–122e is pivotally connected to the carriage 121 as indicated at 123a–123e respectively. For supporting the carriage 121 in the perforating head 41 in such a manner as to be translatable with respect thereto, pairs of rearwardly extending ear portions 125, 126 on the carriage 121 are slideably mounted on a pair of spaced carriage tracks 128, 129 respectively, the opposite ends of which are rigidly mounted on the side frames 75, 130 formed integral with the perforating head.

The ends of the hammers 122a–122e extend through key-hole slots 131a–131e respectively (FIG. 10) formed in the side frame 75 with each hammer end respectively positioned adjacent a different interposer level in a row, for example, interposers 61a–61e. For insuring proper orientation of each hammer with respect to its associated level of interposers, a comb-like support plate 132 (FIG. 9) is rigidly secured to the side frame 75. The support plate 132 has a plurality of rearwardly extending comb-like teeth 134 defining a plurality of slots 135a–135e which are respectively positioned in juxtaposition to the key-hole slots 131a–131e in side frame 75. The elongated hammers 122a–122e thus pass loosely and slideably through both the key-hole slots 131a–131e respectively and the comb slots 135a–135e respectively, with the underlying tooth 134 defining each comb slot serving to support its associated elongated hammer intermediate the ends thereof.

In carrying out the present invention, there is provided a particularly compact arrangement of electrical solenoids for independently actuating the interposer hammers in selected combinations. For this purpose, a plurality of solenoid coils 136a–136e are rigidly mounted on a front frame 138 integral with the perforating head 41. Each solenoid armature 139a–139e (FIGS. 5, 6 and 8) is respectively coupled with one of the elongated hammers 122a–122e through suitable linkage. In the illustrative form of the invention, a plurality of links 140a–140e are pivotally connected at one end by means of pins 141 to the solenoid armatures 139a–139e respectively. The opposite ends of the links 140a–140e are pivotally connected to the respective elongated hammers 122a–122e by means of pins 142. While the particular configuration and location of the solenoids 136 is not critical to the present invention, it has been found that the desired advantage of compactness can be most expeditiously attained by mounting the solenoid coils 136a, 136c and 136e on a bracket 144 rigidly secured to the front frame 138 while mounting the solenoid coils 136b and 136d on a separate bracket 145 rigidly secured to the front frame, with the pivotal connection of the links 140 and the hammers 122a–122e intermediate the carriage 121 and the side frame 75.

As a source of signals for selectively energizing different combinations of hammer solenoids to effect a driving impact between selected hammers and the associated interposers in any one row, a remotely operated keyboard is disclosed in the illustrative embodiment in conjunction with suitable control circuitry. For a present understanding it is sufficient to state that the keyboard 146 (FIGS. 5 and 18) includes a plurality of keys each corresponding to one of the several characters to be representable by perforations, there being one key for each of the characters "0" through "9," "-," "BOW," "LC" and "NA." The special characters "BOW," "LC" and "NA" designate "beginning of word," "late charge," and "now and," respectively. Additionally, the keyboard 146 includes a motor bar 148 and a repeat key 149. Depression of any one key closes an electric switch associated therewith. The switches are associated with a coding matrix 150 (FIG. 18) which causes energization of a unique combination of the solenoids 136a–136e when any one switch is closed, as will be more fully described.

Referring to the exemplary code system of FIG. 2, it will be seen that the character "4" for example, is represented by perforations located at levels C and D. Since the code matrix 150 is wired in accordance with the selected code system, depression of the key corresponding to the character "4" therefore causes simultaneous energization of solenoid coils 136c and 136d. Upon energization of these particular coils, the respective armatures 139c, 139d (FIG. 5) are retracted and, through connecting links 140c, 140d respectively, cause the elongated hammers 122c, 122d to pivot in a counterclockwise direction as viewed in FIG. 8. As the hammers 122c, 122d pivot they drive the interposers disposed opposite their tips, in this example, interposers 61c and 61d forwardly into blocking position over their associated punches 31c, 31d. Upon subsequent downward movement of the perforating head 41, the blocked punches 31c, 31d are driven through the document to perforate holes therein at the desired levels C and D.

For normally retracting the hammers in a clockwise direction, a plurality of coil springs 151a–151e are respectively connected at one end to an upstanding ear 152 formed on each of the hammers 122a–122e (FIG. 8). The springs 151 are connected at their opposite ends to the carriage 121. It will be apparent that the foregoing spring arrangement tends to urge each of the hammers 122a–122e in a clockwise direction about its pivotal connection 123 to the carriage 121. Thus, upon momentary energization of a selected combination of solenoids 136, the corresponding hammers are momentarily pulled in a counterclockwise direction against the bias of their associated springs 151.

In accordance with another important aspect of the present invention, an escapement mechanism is mounted in the perforating head 41 for effecting incremental translation of the hammer supporting carriage with respect to the perforating head so as to position the five hammer tips successively opposite each row of blocking interposers. As illustrated particularly in FIGS. 12–14, an escapement mechanism, generally indicated at 154, is coupled with both the perforating head 41 and the hammer supporting carriage 121 to step the carriage 121 so that the tips of the hammers align successively with the ten rows of blocking interposers 61–70. For normally urging the carriage 121 along the rows of interposers 61–70 (towards the right as viewed in FIG. 12), a pair of elongated carriage springs 155, 156 are respectively connected at one end to a pair of rearwardly extending ears 158, 159 formed on the carriage. The opposite end of each spring is rigidly anchored to a bracket 160 secured to the side frame 130 integral with the perforating head 41. The springs 155, 156 bias the carriage 121 for movement in one direction along the carriage tracks 128, 129.

To make carriage translation incremental, i.e., such that the tips of the hammers 122 will step from row to row of the blocking interposers 61–70, the escapement mechanism 154 includes a pawl 161, pivotally mounted at 162 on a top frame 164 which is integral with the perforating head 41 and extends from the front frame 138 to a back frame 165.

Pallets 166, 168 extend downwardly from the pawl on opposite sides of the pivotal connection 162. The pallet 166 is positioned to be fully engaged during alternate periods (defined by the rocking movement of the pawl 161 about its pivot 162) with one of a plurality of ratchet-like escapement teeth 169 formed on the carriage 121 (FIG. 12). Pallet 168 is positioned to be partially engaged with another of the escapement teeth 169 during intervening periods defined by the rocking movement of the pawl, at which time pallet 166 is completely disengaged from the teeth 169 (FIG. 14).

For normally urging the escapement pawl 161 in a counterclockwise direction (as viewed in FIG. 12) to the effect full engagement of the pallet 166 with one of the ratchet-like teeth 169, a tension spring 170 is connected between a pin 171 integral with the top frame 164 and a laterally extending arm 172 formed integral with the escapement pawl 161. Momentary clockwise movement of the pawl 161 against the bias of spring 170 simultaneously disengages pallet 166 from the ratchet-like teeth 169 and engages pallet 168 with the ratchet teeth at a point intermediate two teeth. Thus, the carriage 121 is free to move to the right under the biasing force of springs 155, 156 an increment of one-half the pitch of the teeth 169, i.e., until the pallet 168 is engaged with one of the teeth 169. During this period of carriage translation, the momentary clockwise rocking movement of the pawl 161 ceases and the spring 170 again urges the pawl in a counterclockwise direction so as to simultaneously disengage the pallet 168 from the carriage and fully engage the pallet 166 with the next escapement tooth 169, thereby insuring that the springs 155, 156 urge the carriage to the right a second increment equal to one-half the pitch of the teeth.

Thus, during one full cycle of clockwise and counterclockwise rocking movement of the escapement pawl 161, the carriage is free to move from one fixed position to a second fixed position under the biasing influence of the carriage springs 155, 156, the total amount of carriage translation being defined by the pitch of the escapement teeth 169. It will be apparent therefore, that by forming the escapement teeth with a pitch equal to the spacing of the interposer rows 61–70, the carriage 121 and its row of hammers 122 step from one row of interposers to the next each time that the escapement pawl 161 is rocked through one full cycle.

In keeping with the present invention, means are provided to rock the escapement pawl 161 through one complete cycle each time that the hammers strike a row of blocking interposers. For accomplishing this, the escapement pawl 161 is connected through a suitable linkage with the armature 174 of a solenoid rigidly mounted on a bracket 175 integral with the front frame 138 of the perforating head 41. As will be described with greater particularity in connection with the wiring diagram in FIG. 18, means are provided for supplying a short current pulse to the solenoid coil 176 each time any of the hammer solenoids 136 are de-energized, thereby affecting momentary energization of the escapement solenoid 176 and momentary retraction (movement to the left, FIG. 13) of the solenoid armature 174. The linkage interconnecting the solenoid armature 174 with the escapement pawl 161 will hereafter be described in connection with FIG. 13 wherein the solenoid 176 is illustrated during the period of momentary energization with the armature 174 in retracted position.

In order to convert the lineal movement of the armature 174 into rocking movement of the escapement pawl 161, a force transmitting link 178 is pivotally mounted at 179 to the side frame 130 (FIG. 12) of the perforating head 41. One end of the link 178 is pivotally connected to the armature 174 by means of a pin 180 while the opposite end of the link is pivotally connected to a hook-like element 181 by means of a pin 182, the latter element defining a floating pivot. The hook-like element 181 has a cam surface 184 at one end thereof positioned to slideably engage a fixed stop 185 integral with the side frame 130. The opposite end of the hook-like element 181 is provided with a hook 186 positioned to be engaged with a laterally extending pin 188 formed integral with the pallet 166 on the escapement pawl 161 when the escapement solenoid 176 is energized. For normally urging the force transmitting link 178 in a counterclockwise direction about its pivot 179 (as viewed in FIG. 13), a tension spring 189 is rigidly secured at one end to a bracket 190 integral with the front frame 138, and at its other end to an upstanding lug 191 positioned on the force transmitting link 178 intermediate its pivotal connections 179, 182. A second tension spring 192 is connected at one end to the lug 191 and at its opposite end to an upstanding lug 194 positioned on the hook-like element 181 adjacent the cam surface 184, thereby continuously urging the element 181 in a counterclockwise direction about its floating pivot 182 so that the cam surface 184 is continually maintained in contact with the fixed stop 185.

The operation of the escapement mechanism 154 is as follows. Each time any one or a combination of the hammer solenoids 136 are de-energized, i.e., following selected positioning of any one row of blocking interposers, a short current pulse energizes the escapement solenoid 176, thereby momentarily retracting the armature 174. With the armature retracted as shown in FIG. 13, the hook 186 engages the pin 188 on the escapement pallet 166. Immediately upon de-energization of the escapement solenoid 176, the spring 189 shifts the link 178 counterclockwise about its pivot 179, thus moving the hook-like element 181 and the engaged pin 188 to the left (downwardly as viewed in FIG. 12). This movement causes clockwise rocking of the escapement pawl 161 and disengagement of the pallet 166 from the escapement teeth 169. As the hook-like element 181 moves to the left, it is simultaneously cammed in a clockwise direction about its floating pivot 182 by the cam surface 184 riding upon the fixed stop 185, thereby allowing the pin 188 to snap out of the hook 186. FIG. 14 illustrates the components at the point where the pin 188 is poised on the hook 186 ready to snap out of the engagement therewith. Upon disengagement of the pin 188 and hook 186, spring 170 urges the escapement pawl 161 in a counterclockwise direction, thus re-engaging the pallet 166 with the next escapement tooth 169. The carriage 121 and its row of hammers 122 are now positioned adjacent the next row of interposers in readiness to strike selected ones thereof.

As a further feature of the present invention, provision is made for automatically returning the carriage and the row of interposer hammers to a position adjacent any selected row of blocking interposers as an incident to relative closing movement between the perforating head 41 and the base 44. This presents the perforating apparatus 30 to perforate any desired number of digits or characters during the next operation. As illustrated in FIGS. 6 and 15, a generally L-shaped lever 195 is pivotally connected at 196 to the back frame 165, and forms a lost motion connection between the carriage 121 and the base 44. The lever 195 has a generally upstanding arm 198 having an outwardly projecting bearing element 199 secured to the upper end thereof, and a shorter, generally horizontal arm 200 having an outwardly projecting bearing element 201 secured at its outer end. The carriage 121 includes a pair of spaced, rearwardly extending ears 202, 204 positioned to receive and hold captive the outwardly extending bearing element 199 on the pivoted lever arm 198. Thus, during translation of the carriage 121 from left to right with respect to the head (as viewed in FIG. 15), the ears 202, 204, through co-action with the bearing element 199 cause pivotal movement of the lever 195 about the fixed pivot 196 on the perforating head 41. As the lever 195 and its arms 198, 200 pivot, the outwardly extending bearing element 201 at the end of the shorter arm 200 is progressively moved downwardly relative to the perforating head. It will be appreciated that the maximum downward position relative to the perforating head (indicated by the dotted line 201') occurs when the carriage 121 is at the limit of its translational movement to the right, i.e., when the row of hammers 122 have stepped through all of the rows of interposers 61–70.

To permit the carriage 121 and the row of supported hammers 122 to be automatically returned to a position adjacent any selected row of interposers 61–70 during relative closing movement between the perforating head and the base, the L-shaped lever 195 is mounted on the perforating head with its lower bearing element 201 oriented over an adjustable stop 205 mounted on the base 44. While the adjustable stop 205 may take various forms, it is illustrated in the exemplary embodiment of FIG. 16 as a plate-like digit selector having a generally octagonal configuration with each chordal face 205a–205h disposed at respectively shorter radial distances from the axis of the plate. For selectively presenting any one of the chordal faces 205a–205h to the bearing element 201 on the pivoted lever 195, the digit selector 205 is rigidly and co-axially mounted on the end of a horizontally disposed shaft 206 which extends through and is journaled in an upstanding wall 208 formed integral with the base 44. On operating knob 209 and position indicating dial 210 are rigidly mounted on the portion of the shaft 206 extending through the base of the perforating apparatus. In order to insure that the digit selector 205 is properly positioned with one of the chordal faces 205a–205h presented to the bearing element 201 on the pivoted lever 195, the selector plate has formed therein a plurality of detent openings 211a–211h respectively associated with the chordal faces 205a–205h, each detent opening located on a radius perpendicular to its associated chordal face and all the detent openings positioned at the same radial distance from the axis of the plate. An upstanding wall 212 on the base has formed therein a bore 214 in which are mounted a spring 215 and a detent ball 216 positioned to be selectively engaged with one of the detent openings 211a–211h. It will be apparent from the foregoing that the operator of the perforating apparatus 30 may selectively position any desired chordal face 205a–205h on the detented digit selector plate 205 in position to be engaged by the bearing element 201 on the pivoted lever 195 merely by turning the operating knob 209 and watching the indicator dial 210.

When the operator intends to perforate successive documents with the full number of digits (ten in the exemplary apparatus), the detented digit selector plate 205 is positioned with the chordal face 205a in its uppermost position (FIG. 15). As the carriage 121 moves from left to right the bearing element 201 on the pivoted lever 195 moves from its full line position to the dotted line position 201' in abutment with the chordal face 205a. Thus, upon subsequent relative closing movement between the perforating head 41 and the base 44, the lever 195 is pivoted in a counterclockwise direction through co-action between the abutting bearing element 201 and the chordal face 205a, so as to return the carriage 121 to its starting position. However, when the operator intends to perforate fewer than the full number of digits during the next perforating operation, he need only rotate the digit selector plate 205 to the desired position. For example, if it is desired to perforate a three digit number, during the next perforating operation, the chordal face 205h is turned to the uppermost position. When the carriage 121 and its row of hammers 122 have stepped through all of the interposer rows, and the bearing element 201 has moved to its dotted line position 201', the bearing element will be oriented over the chordal face 205h but spaced therefrom an amount equal to the difference in the radial dispositions of the chordal faces 205a and 205h. Upon relative closing movement between the perforating head and the base, the bearing element 201 moves downwardly until it abuts the chordal face 205h without returning the carriage 121. Upon abutment with the chordal face 205h, further relative closing movement causes pivoting of the lever 195 and partial return of the carriage.

It will be understood that the radial dispositions of the chordal faces are selected such that each face is properly dimensioned to return the carriage to a different position with its row of supported hammers 122 adjacent a different row of interposers. It will be further understood that the digit selector plate may have more or less than the exemplary eight chordal faces, thus enabling the positioning apparatus 120 to be automatically returned to any desired number of digital positions.

In order to insure that each blocking interposer is accurately located in one of two fixed positions, either a blocking position or a nonblocking position, and to further provide a resilient means for absorbing the hammer impact, a plurality of comb-like spring elements 218a–218e are rigidly mounted on the back frame 165 of the perforating head 41, each associated with a different level of blocking interposers (FIG. 11). Each spring element 218 has a plurality of forwardly projecting flexible arms 219 and each arm has formed thereon a V-shaped bend defining a detent 220. The rearwardly extending portion 78 of each interposer, for example, interposer 70e, has formed therein a pair of adjacent V-shaped detent openings 221, 222 defining a knife edge 224 therebetween (FIG. 10).

In the illustrative form of the invention, each V-shaped spring detent 220 is shown engaged with the forward V-shaped detent opening 221. When each hammer, for example, hammer 122e, strikes its associated interposer 70e and drives it forward, the spring arm 219 flexes, allowing the V-shaped detent 220 to move out of engagement with the detent opening 221 and to reseat in the detent opening 222. It will be appreciated that each detent 220 is engaged with eithere detent opening 221 (positively holding the interposer in nonblocking position) or detent opening 222 (positively holding the interposer in blocking position). Since the openings 221, 222 are separated by a knife edge 224, it is apparent that the hammer impact cannot result in partial movement of the associated interposer, but rather, that each hammer impact accurately locates the associated interposer over its respective punch in blocking position. Moreover, the detents further serve to hold each of the blocking interposers in the desired position prior to actuation of the perforating head, thus insuring that accidental jarring of the perforating apparatus 30 will not mislocate any interposer.

In carrying out the present invention, an interposer clearing mechanism is provided for automatically returning all the driven blocking interposers to a nonblocking position subsequent to a perforating operation, together with apparatus for disabling the clearing mechanism in the event the operator desires to perforate the same coded indicia in another document. An interposer clearing mechanism, generally indicated at 225, is illustrated in FIGS. 5 and 17 for affirmatively and simultaneously returning all the interposers in the rows 61–70 each time that relative opening movement occurs between the perforating head 41 and the base 44 of the perforating apparatus 30. To this end, a rake plate 226 having a plurality of laterally extending rake fingers 228a–228e is mounted on the side frame 74 of the perforating head 41. The rake fingers 228a–228e extend loosely through rectangular slots 229a–229e respectively formed in the side frame 74. The rake fingers 228 further extend through slots 230 formed in each interposer with finger 228a, for example, extending through the slots 230 formed in each interposer 61a–70a in the A level. As viewed in FIG. 10, each rake finger 228 is normally positioned adjacent the forward or left end of each slot 230 when the interposers are in a nonblocking position, thus leaving ample clearance in the slots for the interposers to be driven forwardly. It will be appreciated however, that after selection of any one interposer or combination thereof, the rear or right end of each slot 230 will be in juxtaposition with the associated finger 228 and consequently, rearward movement of the finger will cause retraction of the selected interposer.

In order to simultaneously return all the blocking interposers to a nonblocking position, provision is made for automatically reciprocating the rake plate rearwardly and forwardly each time the perforating head opens relative to the article being perforated. This is accomplished by mounting the rake plate 226 on a pair of fixed pins 231, 232 integral with the side frame 74, the pins extending respectively through a pair of elongated slots 234, 235 formed in the plate. For normally urging the rake 226 and the integral rake fingers into their forward position, a spring 236 is connected at one end to a bracket 238 anchored in the side plate 55 integral with the perforating head 41. The opposite end of the spring 236 is connected to an upstanding lug 239 formed on the rake plate 226.

Referring to FIG. 17, it will be apparent that the parallel link mechanism heretofore described for effecting lineal reciprocation of the perforating head 41 is duplicated on each side of the perforating apparatus 30, there being illustrated a second set of parallel links 94′, 95′, a second set of coupling pins 91′, 92′, and a second pitman 100′ utilized to couple the slide 90 to the eccentric drive shaft 99.

To provide for automatically retracting the rake plate 226 and fingers 228 against the bias of the spring 236 each time the perforating head moves upwardly, a hook 240 is pivotally mounted at one end 241 to the side frame 74, with the other end of the hook 240 in abutment with a second upstanding lug 242 integral with the rake plate 226. A floating lever 244 having a C-shaped cam surface 245 is coupled at one end with the hook 240 intermediate the ends of the hook by means of a pin 246. As will be described with greater particularity below, the opposite end of the floating lever 244 is coupled to a link 248 by means of a pin 249, the link and the pin forming a selectively floatable pivot. A laterally extending pin-like cam 250 is rigidly secured to the pitman 100′ and positioned to engage the C-shaped cam surface 245 on the floating lever 244 during the initial portion of each upstroke of the pitman.

During a single full rotation of the eccentric shaft, the pin-like cam 250 moves through a generally oval path (FIG. 17). During the first half revolution of the eccentric shaft 99, the cam 250 moves downwardly towards the floating lever 244, entering the C-shaped cam surface at the bottom of its downward stroke. During the initial portion of the upstroke, the cam 250 engages the cam surface 245, camming the lever to the left about the floating pivot 249. As the lever 244 is cammed to the left it pivots the hook 240 to the left about the pivot pin 241, thus driving the lug 242 on the rake plate 226 rearwardly and causing the rake fingers 228 to engage and simultaneously retract all of the interposers that are in a blocking position. During the final portion of its upstroke, the cam 250 snaps out of the C-shaped cam surface 245 and the spring 236 immediately returns the rake plate 226 and fingers 228 to their forward position.

In accordance with a further important aspect of the present invention provision is made for disabling the interposer clearing mechanism 225 when the operator desires to perforate the same coded indicia in successive documents. In order to accomplish this, the end of the link 248 remote from the floating pivot 249 is connected to the armature 251 of a solenoid having a coil 252 by means of a pin 254. The solenoid 252 is rigidly mounted on a bracket 255 integral with the frame of the perforating apparatus 30. When the operator desires to disable the interposer clearing mechanism 225, it is only necessary to depress the repeat key 149 on the keyboard 146, thereby completing an energizing circuit for the solenoid coil 252. Upon energization of the solenoid coil 252, the armature 251, link 248 and the floating pivot 249 are all retracted, thus causing the floating lever 244 to pivot about the pin 246 coupling the lever to the hook 240. In this manner, the C-shaped cam surface 245 on the lever 244 is moved out of the oval path traversed by the cam pin 250. Since the cam pin 250 does not engage the C-shaped cam surface 245 during the upstroke when the cam surface is retracted, that is to say, during the relative opening movement between the perforating head 41 and the base 44, the rake plate 226 and fingers 228 remain fixed and the rows of interposers 61–70 are retained in their selected blocking positions by means of the spring detents 220.

To eliminate the possibility of the perforating head 41 moving through a second perforating cycle should the motor bar 148 stick or should the operator continue to hold it in a depressed position, control means are provided for insuring that the motor 104 is de-energized upon completion of each cycle of operation. Referring to FIG. 3, this is accomplished by mounting a normally open head-down switch HDS responsive to the vertical position of the perforating head 41 on the frame of the perforating apparatus 30. A head-down switch actuator $HDS_a$ is disposed beneath a lever 256 interposed in the path of one of the parallel links, for example, link 95. Thus, as the perforating head 41 moves down, the lever 256 and the head-down switch actuator $HDS_a$ are depressed, closing the normally open head-down switch HDS and completing an energizing circuit for a relay R1 which controls normally closed contacts $R1_a$ and normally open contacts $R1_b$ (FIG. 18). As soon as the relay R1 is energized, the contacts $R1_a$ open to de-energize the solenoid 110 controlling the driven member 109 of the one revolution clutch, and the contacts $R1_b$ close so that the relay R1 remains sealed in as long as the motor bar 148 is depressed, thereby insuring that the clutch control solenoid 110 will remain de-energized.

To insure accurate stepping of the escapement mechanism 154, means are provided to momentarily energize the solenoid 176 each time any one or combination of the hammer solenoids are de-energized. As here shown, input conductors $L_a$–$L_e$ (FIG. 18) for the hammer solenoids 136 are respectively connected to a relay R2 through a plurality of asymmetrically conductive devices, here shown as diodes 258a–258e, the relay R2 controlling normally closed contacts $R2_a$ and normally open contacts $R2_b$. Thus, each time that any one or combination of the hammer solenoids 136 are energized, an energizing circuit for the relay R2 is completed. When the relay R2 is energized the contacts $R2_a$ open breaking a series circuit which includes a capacitor 259 and solenoid 176. Simultaneously, the contacts $R2_b$ close to connect the capacitor 259 across the lines L1, L2 and charging it quickly. When the previously closed key is released to de-energize all of the hammer solenoids 136, the energizing circuit for the relay R2 is broken to drop out the contacts $R2_b$ and reclose contacts $R2_a$. Capacitor 259 then discharges through the closed contacts $R2_a$ and the solenoid 176, so that the latter receives a short current pulse, which momentarily energizes the escapement solenoid.

For energizing the hammer solenoids 136 in selected combinations, each of the fourteen character keys (ten number keys and four symbol keys) on the keyboard 146 are adapted to selectively complete different energizing circuits between the voltage supply lines L1 and L2 through the coding matrix 150 (FIG. 18). The coding matrix has fourteen input conductors L3 corresponding to the fourteen character keys and five output conductors $L_a$–$L_e$ leading through the respective hammer solenoid coils 136a–136e to the line L2. Each input conductor L3 is connected through one of the key switches 261a–261n to the voltage supply line L1, and each is connected by asymmetrically conductive devices, here shown as diodes 260, to a particular combination of the five output conductors $L_a$–$L_e$, according to the in-line code system of FIG. 2. The manner in which the diodes 260 within the coding matrix 150 are located in order to bring this about will be apparent from inspection of FIG. 18, the diodes serving to energize a unique combination of the output conductors and hammer solenoids in response to the current flowing in any selected input conductors. By way of example, the input line L3 associated with the switch 261g for the key corresponding to "5" is connected by diodes to the output lines L$b$ and L$d$. When that switch is closed, current flows from the line L1 through those two diodes and through the solenoids 136b, 136d, thereby actuating the sammers 122b, 122d. This sets the interposers in levels B and D of one row, so that the corresponding punches will create holes at levels B and D in one row of the perforation field. That row of holes will represent the character "5" according to the code table of FIG. 2.

The control circuit (FIG. 18) for the present perforating apparatus will be briefly summarized in conjunction with the operation of the machine. By way of example, assuming that the operator wishes to perforate the account number "8013245769" in a book of checks 25, it is merely necessary that he place the book of checks in the transverse slot 48 formed in the perforating apparatus 30 and successively select each digit of the account number reading from left to right by punching the proper keys on the keyboard 146. Thus, after positioning the checkbook, the operator first selects and depresses the character "8" key, thereby simultaneously energizing hammer solenoids 136a–136d and driving their associated interposers 61a–61d into blocking position over the respective punches 31a–31d. Simultaneously with the energization of the selected hammer solenoids, the relay R2 is energized so as to charge the capacitor 259. When the operator releases the character "8" key the hammer solenoids are de-energized and the hammer springs 151 return the hammers 122 to their aligned position.

Simultaneously with the de-energization of the hammer solenoids the relay R2 is de-energized, thus allowing the capacitor 259 to discharge through the escapement solenoid 176, momentarily energizing the latter. Upon momentary energization of the escapement solenoid, the escapement hook 186 (FIG. 13) is engaged with the pin 188 formed on the escapement pawl 161. When the escapement solenoid 176 is de-energized, the spring 189 causes momentary retraction of the pallet 166 from its full engagement with the escapement teeth 169 allowing the carriage springs 155, 156 to effect translation of the carriage 121 an increment of ½ the pitch of the escapement teeth 169 (FIG. 14). At this point, the escapement pin 188 snaps out of engagement with the hook 186 and the escapement pallet 166 re-engages with the next escapement tooth 169 thereby effecting a total incremental translation of the carriage a distance equal to the pitch of the escapement teeth 169 and positioning the alined row of hammers 122 adjacent the next row of interposers 62.

The operator now depresses the character "0" key corresponding to the second numerical digit of the account number and the foregoing steps are repeated in such a manner as to position the blocking interposers 62a, 62c, 62d and 62e over their associated punches. The operator then successively presses the designated keys for each remaining numerical digit in the account number thus positioning all of the blocking interposers over their associated punches in accordance with the perforated characters selected, at which point depression of the motor bar 148 effects perforation of the checkbook.

Before depressing the motor bar to effect perforation of the checkbook, it is desirable that the operator determine what indicia is to be perforated in other documents during subsequent perforating operations. For example, if the same account number is to be perforated in successive documents, the operator depresses the repeat key 149 closing normally open contacts 261o and causing energization of the solenoid 252 and retraction of the floating lever 244 in the interposer clearing mechanism 225. In this manner, the linkage defining a lost motion connection between the eccentric shaft 99 and the rake fingers 228 is incapacitated and the interposers are left in position to effect perforation of the account number "8013245769" in successive documents. On the other hand, if the operator desires to perforate a document with indicia having, for example, only four digits during the next perforating operation, he turns the digit selector 205 until the chordal face 205g is in its uppermost position, thus insuring that upon closing movement of the perforating head relative to the article being perforated, the row of alined hammers 122 is returned to a position adjacent the blocking interposers in row 67.

Having determined whether the information to be perforated is to be repetitive in successive documents or whether a different number of digits are to be positioned on successive documents, the operator is now ready to effect perforation by depressing the motor bar 148. When the motor bar is depressed, normally open contacts 261p are closed, energizing the clutch control solenoid 110 and withdrawing the clutch control pin 114 from the cam track 115 in the driven clutch member 109. As the pin 114 is withdrawn, the cam 118 formed thereon effects closing of the cam switch 119, completing an energizing circuit to the relay R3 which controls normally open motor contacts R3$_a$. Closure of the normally open contacts R3$_a$ energizes the motor 104 which, through suitable reduction gearing and through the one revolution clutch, causes rotation of the eccentric drive shaft 99, thus driving the head through a downward and upward stroke. Upon completion of one full revolution of the eccentric drive shaft 99 and the one revolution clutch, the spring biased clutch control pin 114 snaps back into the cam track 115 on the driven clutch member 109, simultaneously uncoupling the one revolution clutch and opening the cam switch 119. When the cam switch 119 opens, the relay R3 is de-energized, breaking the motor circuit.

It will be appreciated that there has been disclosed a highly compact and versatile perforating machine capable of simultaneously perforating coded in-line indicia in a plurality of documents. The apparatus is susceptible to a wide range of uses since by merely turning a selector dial, the operator may perforate any desired number of digits. Moreover, the apparatus is highly accurate requiring only that the operator select the proper key on the keyboard for each line of coded perforations. Where desired, the perforating apparatus may be set up to repetitively place the same coded indicia in a plurality of documents during successive perforating operations.

We claim as our invention:

1. In a perforation machine, the combination comprising, a base, a die block mounted on said base for supporting a document, said die block having a plurality of punch receiving openings arranged at closely adjacent stations in a rectangular array, a supporting head carried by said base and relatively movable with respect to said die block, a plurality of punches arranged in a plurality of rows for selective registration with said openings, means mounting said punches on said head for relative and independent end-wise movement, a plurality of interposers arranged in a plurality of rows corresponding to said rows of punches, each of said interposers being mounted on said head for independent end-wise movement to a position overlying one end of its associate punch, a row of actuators adapted to selectively engage respective ones of the interposers in any one row for urging said engaged interposers into a position overlying their associated punches, power means for selectively driving said actuators, means for translating said row of actuators with respect to said head in successive steps so that certain selected interposers in each row are positioned over their associated punches, means effecting relative movement between said head and said die block so that those punches having an interposer positioned thereover are driven through said document, and means for automatically returning said punches, interposers and actuators to their starting position incident to a perforation cycle of said machine.

2. In a perforation machine, the combination comprising, a base for supporting a document to be perforated, said base having a plurality of punch receiving openings arranged at closely adjacent stations in a rectangular array, a supporting head carried by said base and relatively movable with respect to said die block, a plurality of punches arranged in a plurality of rows for selective registration with said openings, said punches mounted on said head for relative and independent end-wise movement, a plurality of interposers arranged in a plurality of rows corresponding to said rows of punches, each of said interposers being mounted on said head for independent end-wise movement to a position overlying one end of its associate punch, a row of actuators adapted to selectively engage respective ones of the interposers in any one row for urging said engaged interposers into a position overlying their associate punches, power means for selectively driving said actuators, means for translating said row of actuators with respect to said head in successive steps so that certain selected interposers in each row are positioned over their associated punches, means effecting relative closing movement between said head and said base so that those punches having an interposer positioned thereover are driven through said document, means for automatically returning said punches and interposers to their starting position subsequent to perforation of said document, means for selectively disabling said interposer returning means, and means for returning said actuators to a position adjacent any desired row of interposers during the relative closing movement between said head and said base.

3. In a perforation machine, the combination comprising, a base for supporting an article to be perforated, a supporting head mounted on said base for relative movement with respect to said article, a plurality of elongated punches arranged in a rectangular array of columns and stepped rows with one end of each punch disposed in a common punch plane over an article to be perforated, said punches carried by said head for independent end-wise movement, a stepped row of interposers associated with each of the stepped rows of punches, a row of hammers carried by said head and translatable with respect thereto, power means adapted to selectively actuate different combinations of said hammers for driving selected interposers in one of said stepped rows into a position overlying their associated punches, and means mounted on said head effecting incremental translation of said row of hammers so that each of said stepped rows of interposers are selectively and successively positioned.

4. In a perforation machine, the combination comprising, a base for supporting an article to be perforated, a supporting head mounted on said base for relative movement with respect to said article, a plurality of elongated punches arranged in a rectangular array of columns and stepped rows with one end of each punch disposed in a common punch plane over an article to be perforated, said punches carried by said head for independent end-wise movement, a stepped row of interposers associated with each of said stepped rows of punches, a carriage carried by said head and translatable with respect thereto, a plurality of elongated hammers each pivotally mounted at one end to said carriage, the opposite end of each of said hammers disposed in a row adjacent one of said rows of interposers, power means mounted on said head coupled to each of said elongated hammers intermediate the ends thereof, said power means adapted to selectively actuate different combinations of said hammers for driving selected interposers in one of said stepped rows into a position overlying their associated punches, and means mounted on said head effecting incremental translation of said carriage so that each of said stepped rows of interposers are selectively and successively positioned.

5. In a perforation machine, the combination comprising, a base for supporting an article to be perforated, a supporting head mounted on said base for relative movement with respect to said article, a plurality of elongated punches arranged in a rectangular array of columns and stepped rows with one end of each punch disposed in a common punch plane over an article to be perforated, said punches carried by said head for independent end-wise movement, a stepped row of interposers associated with each of the stepped rows of punches, a carriage carried by said head and translatable with respect thereto, a plurality of elongated hammers each pivotally mounted at one end to said carriage, the opposite end of each of said hammers disposed in a row adjacent one of said rows of interposers, a plurality of solenoids mounted on said head each including a coil and armature, each armature coupled to a different one of said hammers intermediate the ends thereof so that upon energization of different combinations of said solenoid coils, the respectively coupled armatures and hammers drive their associated interposers into a position overlying the associated punches, and means mounted on said head effecting incremental translation of said carriage so that each of said stepped rows of interposers are selectively and successively positioned.

6. In a perforation machine, the combination comprising, a base for supporting an article to be perforated, a supporting head mounted on said base for relative movement with respect to said article, a plurality of elongated punches arranged in a rectangular array of columns and stepped rows with one end of each punch disposed in a common punch plane over an article to be perforated, said punches carried by said head for independent end-wise movement, a stepped row of interposers associated with each of the stepped rows of punches, a carriage carried by said head and translatable with respect thereto, a plurality of hammers arranged in a row pivotally mounted on said carriage, means mounted on said head for biasing said carriage in one direction, yieldable stop means pivotally mounted on said head coupled with said carriage for holding said carriage in a fixed position with said row of hammers adjacent one row of interposers, power means adapted to selectively actuate different combinations of said hammers for driving selected interposers in one of said stepped rows into a position overlying their associated punches, and means mounted on said head coupled to said stop means adapted to momentarily uncouple said stop means and said carriage for allowing incremental movement of the latter.

7. In a perforation machine, the combination comprising, a base for supporting an article to be perforated, a supporting head mounted on said base for relative movement with respect to said article, a plurality of elongated punches arranged in a rectangular array of columns and stepped rows with one end of each punch disposed in a common punch plane over an article to be perforated, said punches carried by said head for independent endwise movement, a stepped row of interposers associated with each of the stepped rows of punches, a row of hammers carried by said head and translatable with respect thereto, power means adapted to selectively actuate different combinations of said hammers for driving selected interposers in one of said stepped rows into a blocking position overlying their associated punches, means mounted on said head effecting incremental translation of said row of hammers so that each of said stepped rows of interposers are selectively and successively positioned, a rake plate mounted on said head for relative movement with respect to said head, a plurality of rake fingers integral with said rake plate, each rake finger extending loosely through one interposer in each row of interposers, lost motion means effecting relative movement between said head and said rake plate for affirmatively returning all of said interposers to a nonblocking position, and means for selectively disabling said lost motion means.

8. In a perforation machine, the combination comprising, a base for supporting an article to be perforated, a frame rigidly mounted on said base, a plurality of parallel stepped shelves mounted on said frame in spaced apart relation, said stepped shelves positioned to overlie the article being perforated with the shortest shelf the most remote from said article, a supporting head carried by said base for relative movement with respect to said article, a plurality of punches mounted in a row on said head for independent end-wise movement, one end of each of said punches terminating in a common punch plane disposed beneath said shelves and the opposite ends of said punches stepped to conform to the stepped configuration of said shelves, the longest of said stepped punches mounted in said head so as to slideably extend through each of said shelves and each successive punch slideably extending through one less shelf, a plurality of interposers mounted on said head for independent end-wise movement, said interposers stepped to conform to the stepped configuration of said punches, each of said stepped interposers positioned to be selectively projected over its associated punch, a plurality of hammers carried by said head for driving said interposers forward into their projected position, power means for selectively actuating certain of said hammers, and means for effecting relative movement between said head and said article whereby those punches having interposers positioned thereover are driven through the article.

9. In a perforation machine, the combination comprising, a base for supporting an article to be perforated, a frame rigidly mounted on said base, a plurality of parallel stepped shelves mounted on said frame in spaced apart relation, said stepped shelves positioned to overlie the article being perforated with the shortest shelf the most remote from said article, a supporting head carried by said base for relative movement with respect to said article, a plurality of punches mounted in a row on said head for independent end-wise movement, one end of each of said punches terminating in a common punch plane disposed beneath said shelves and the opposite ends of said punches stepped to conform to the stepped configuration of said shelves, the longest of said stepped punches mounted in said head so as to slideably extend through each of said shelves and each successive punch slideably extending through one less shelf, a plurality of interposers mounted on said head for independent end-wise movement, said interposers stepped to conform to the stepped configuration of said punches, each of said interposers having a pair of detent openings formed therein, a plurality of detents mounted on said head each cooperating with one of said interposers for retaining the interposer in one of two positions defined by the spacing between said detent openings, each of said stepped interposers positioned to be selectively projected over its associated punch, a plurality of hammers carried by said head for driving said interposers forward into their projected position, stop means mounted on said head and cooperating with said interposers for limiting the amount of forward movement, power means for selectively actuating certain of said hammers and means for effecting relative movement between said head and said article whereby those punches having interposers positioned thereover are driven through the article.

10. In a perforation machine, the combination comprising, a base for supporting an article to be perforated, a frame rigidly mounted on said base, a plurality of parallel stepped shelves mounted on said frame in spaced apart relation, said stepped shelves positioned to overlie the article being perforated with the shortest shelf the most remote from said article, a supporting head carried by said base for relative movement towards and away from said article, linkage interconnecting said head and said base, a plurality of punches mounted in a row on said head for independent end-wise movement, one end of each of said punches terminating in a common punch plane disposed beneath said shelves and the opposite ends of said punches stepped to conform to the stepped configuration of said shelves, the longest of said stepped punches mounted in said head so as to slideably extend through each of said shelves and each successive punch slideably extending through one less shelf, a plurality of interposers mounted on said head for independent end-wise movement, said interposers stepped to conform to the stepped configuration of said punches, each of said stepped interposers positioned to be selectively projected over its associated punch, a plurality of hammers carried by said head for driving said interposers forward into their projected position, power means for selectively actuating certain of said hammers, means for effecting relative movement of said head towards said article whereby those punches having interposers positioned thereover are driven through the article, and means defining a lost motion connection between said linkage and said interposers for positively returning the latter during relative movement of said head away from said article.

11. In a perforation machine, the combination comprising, a base for supporting an article to be perforated, a frame rigidly mounted on said base, a plurality of parallel stepped shelves mounted on said frame in spaced apart relation, said stepped shelves positioned to overlie the article being perforated with the shortest shelf the most remote from said article, a supporting head carried by said base for movement towards and away from said article, a plurality of punches mounted in a row on said head for independent end-wise movement, a raised portion formed on each punch intermediate its ends, one end of each of said punches terminating in a common punch plane disposed beneath said shelves and the opposite ends of said punches stepped to conform to the stepped configuration of said shelves, the longest of said stepped punches mounted in said head so as to slideably extend through each of said shelves and each successive punch slideably extending through one less shelf, a plurality of interposers mounted on said head for independent end-wise movement, said interposers stepped to conform to the stepped configuration of said punches, each of said stepped interposers positioned to be selectively projected over its associated punch, a plurality of hammers carried by said head for driving said interposers forward into their projected position, power means for selectively actuating certain of said hammers, and means for effecting movement of said head towards said article whereby those punches having interposers positioned thereover are driven through the article, and means mounted on said head positioned to engage the raised portion on each of said punches for positively withdrawing those punches which have been driven through the article during movement of said head away from the article.

12. In a perforation machine, the combination comprising, a base for supporting an article to be perforated, a frame rigidly mounted on said base, a plurality of parallel stepped shelves mounted on said frame in spaced apart relation, said stepped shelves positioned to overlie the article being perforated with the shortest shelf the most remote from said article, a supporting head carried by said base for relative movement with respect to said article, a plurality of punches mounted in a row on said head for independent end-wise movement, one end of each of said punches terminating in a common punch plane disposed beneath said shelves and the opposite ends of said punches stepped to conform to the stepped configuration of said shelves, the longest of said stepped punches mounted in said head so as to slideably extend through each of said shelves and each successive punch slideably extending through one less shelf, a plurality of interposers mounted on said head for independent end-wise movement, said interposers stepped to conform to the stepped configuration of said punches, each of said stepped interposers positioned to be selectively projected over its associated punch, a plurality of hammers carried by said head for driving said interposers forward into their projected position, a plurality of solenoids each including a coil and armature mounted on said head with each solenoid armature coupled to a different one of said hammers, means for selectively energizing different combinations of said solenoid coils so as to actuate selected combinations of said armatures and coupled hammers, and means for effecting relative movement between said head and said article whereby those punches having interposers positioned thereover are driven through the article.

13. In a perforation machine, the combination comprising, a base for supporting an article to be perforated, a frame rigidly mounted on said base, a plurality of parallel stepped shelves mounted on said frame in spaced apart relation, said stepped shelves positioned to overlie the article being perforated with the shortest shelf the most remote from said article, a supporting head carried by said base for relative movement with respect to said article, a plurality of punches mounted in a rectangular array of rows and columns on said head for independent end-wise movement, one end of each of said punches terminating in a common punch plane disposed beneath said shelves, the punches in each column having a common length, said columns of punches respectively stepped to conform to the configuration of said stepped shelves, said stepped punches in the column having the greatest length extending through each of said shelves in slideable relationship therewith and each successive column of punches slideably extending through one less shelf respectively, a plurality of interposers mounted on said head for independent end-wise movement, said interposers arranged in a rectangular array of columns and stepped rows so as to conform to the stepped configuration of said punches, each of the interposers in any of said stepped rows positioned to be selectively projected over its associated punch, a plurality of hammers arranged in a row carried by said head and translatable with respect thereto for driving the interposers in any one of said stepped rows forward into their projected position, power means for selectively actuating certain of said hammers, means for translating said row of hammers in fixed increments so that said row of hammers will act successively upon each of said rows of interposers, and means for effecting relative movement between said head and said article whereby those punches having an interposer positioned thereover are driven through the article.

14. In a perforation machine, the combination comprising, a base for supporting an article to be perforated, a frame rigidly mounted on said base, a plurality of parallel stepped shelves mounted on said frame in spaced apart relation, said stepped shelves positioned to overlie the article being perforated with the shortest shelf the most remote from said article, a supporting head carried by said base for relative movement with respect to said article, a plurality of punches mounted in a rectangular array of rows and columns on said head for independent end-wise movement, one end of each of said punches terminating in a common punch plane disposed beneath said shelves, the punches in each column having a common length, said columns of punches respectively stepped to conform to the configuration of said stepped shelves, the column of said stepped punches having the greatest length slideably extending through each of said shelves and each successive column of punches slideably extending through one less shelf, a plurality of interposers mounted on said head for independent end-wise movement, said interposers arranged in a rectangular array of columns and stepped rows so as to conform to the stepped configuration of said punches, means mounted on said head for resiliently and independently holding said interposers in a position where their associated punches have freedom for end-wise movement, a plurality of hammers arranged in a row carried by said head and translatable with respect thereto for driving the interposers in any one of said stepped rows forward into a position blocking their associated punches, power means for selectively actuating certain of said hammers, means for translating said row of hammers in fixed increments so that said row of hammers will act successively upon each of said rows of interposers, and means for effecting relative movement between said head and said article whereby those punches having a blocking interposer positioned thereover are driven through the article.

15. In a perforation machine, the combination comprising, a base for supporting an article to be perforated, a frame rigidly mounted on said base, a plurality of parallel stepped shelves mounted on said frame in spaced apart relation, said stepped shelves positioned to overlie the article being perforated with the shortest shelf the most remote from said article, a supporting head carried by said base for relative movement with respect to said article, a plurality of punches mounted in a rectangular array of rows and columns on said head for independent end-wise movement, one end of each of said punches terminating in a common punch plane disposed beneath said shelves, the punches in each column having a common length, said columns of punches being stepped to conform to the configuration of said stepped shelves, the column of said stepped punches having the greatest length slideably extending through each of said shelves and each successive column of punches slideably extending through one less shelf, a plurality of interposers mounted on said head for independent end-wise movement, said interposers arranged in a rectangular array of columns and stepped rows so as to conform to the stepped configuration of said punches, each of the interposers in any of said stepped rows positioned to be selectively projected over its associated punch, a carriage carried by said head and translatable with respect thereto, a plurality of hammers arranged in a row and pivotally mounted on said carriage for driving the interposers in any one of said stepped rows forward into their projected position, power means for selectively actuating certain of said hammers, an escapement mechanism mounted on said head and coupled to said carriage for insuring incremental translation of said carriage with respect to said head, means for energizing said power means after each increment of carriage movement so that said row of hammers will act successively upon each of said rows of interposers, and means for effecting relative movement between said head and said article whereby those punches having an interposer positioned thereover are driven through the article.

16. In a perforation machine, the combination comprising, a base for supporting an article to be perforated, a frame rigidly mounted on said base, a plurality of parallel stepped shelves mounted on said frame in spaced apart relation, said stepped shelves positioned to overlie the article being perforated with the shortest shelf the most remote from said article, a supporting head carried by said base for relative movement with respect to said article, a plurality of punches mounted in a rectangular array of rows and columns on said head for independent end-wise movement, one end of each of said punches terminating in a common punch plane disposed beneath said shelves, the punches in each column having a common length, said columns of punches respectively stepped to conform to the configuration of said stepped shelves, said stepped punches in the column having the greatest length extending through each of said shelves in slidable relationship therewith and each successive column of punches slideably extending through one less shelf respectively, a plurality of interposers mounted on said head for independent endwise movement, said interposers arranged in a rectangular array of columns and stepped rows so as to conform to the stepped configuration of said punches, each of the interposers in any of said stepped rows positioned to be selectively projected over its associated punch, a plurality of hammers arranged in a row carried by said head and translatable with respect thereto for driving the interposers in any one of said stepped rows forward into their projected position, a plurality of solenoids mounted on said head each including a coil and an armature, each solenoid armature coupled to a different one of said hammers for actuation thereof, means for selectively energizing different combinations of said solenoid coils, means for translating said row of hammers in fixed increments so that said row of hammers will act successively upon each of said rows of interposers, and means for effecting relative movement between said head and said article whereby those punches having an interposer positioned thereover are driven through the article.

17. In a perforation machine, the combination comprising, a base for supporting an article to be perforated, a frame rigidly mounted on said base, a plurality of parallel stepped shelves mounted on said frame in spaced apart relation, said stepped shelves positioned to overlie the article being perforated with the shortest shelf the most remote from said article, a supporting head carried by said base for relative movement with respect to said article, a plurality of punches mounted in a rectangular array of rows and columns on said head for independent end-wise movement, one end of each of said punches terminating in a common punch plane disposed beneath said shelves, the punches in each column having a common length, said columns of punches respectively stepped to conform to the configuration of said stepped shelves, said stepped punches in the column having the greatest length extending through each of said shelves in slidable relationship therewith and each successive column of punches slideably extending through one less shelf respectively, a plurality of interposers mounted on said head for independent end-wise movement, said interposers arranged in a rectangular array of columns and stepped rows so as to conform to the stepped configuration of said punches, each of the interposers in any of said stepped rows positioned to be selectively projected over its associated punch, a carriage carried by said head and translatable with respect thereto, a plurality of hammers arranged in a row and pivotally mounted on said carriage for driving the interposers in any one of said stepped rows forward into their projected position, power means for selectively actuating certain of said hammers, means for translating said carriage in fixed increments so that said row of hammers will act successively upon each of said rows of interposers, means for effecting relative movement of said head towards said article whereby those punches having an interposer positioned thereover are driven through the article, an adjustable stop mounted on said base, and means providing a lost motion connection between said stop and said carriage for positively returning said row of hammers to a position adjacent any one of said rows of interposers.

18. In a perforating head of the type including a plurality of rows of punches and a plurality of rows of interposers associated therewith, apparatus for selectively positioning certain of said interposers in blocking position over their associated punches comprising, in combination, a carriage mounted on said head and translatable with respect thereto, a row of hammers pivotally mounted on said carriage, power means mounted on said head coupled to said hammers, said power means adapted to selectively actuate different combinations of said hammers for driving selected interposers in one row thereof into said blocking position, and means effecting incremental translation of said carriage so that said hammers are positioned successively adjacent each of said rows of interposers.

19. In a perforating head of the type including a plurality of rows of punches and a plurality of rows of interposers associated therewith, apparatus for selectively positioning certain of said interposers in blocking position over their associated punches comprising, in combination, a carriage mounted on said head and translatable with respect thereto, a row of hammers pivotally mounted on said carriage, a plurality of solenoids mounted on said head each including a coil and an armature, means coupling each of said solenoid armatures with a respective hammer, means for selectively energizing different combinations of said solenoid coils, said last named means adapted to actuate different combinations of said coupled armatures and hammers for driving selected interposers in one row thereof into said blocking position, and means effecting incremental translation of said carriage so that said hammers are positioned successively adjacent each of said rows of interposers.

20. In a perforating head of the type including a plurality of rows of punches and a plurality of rows of interposers associated therewith, apparatus for selectively driving certain of said interposers into blocking position over their associated punches comprising, in combination, a carriage mounted on said head and translatable with respect thereto, a plurality of elongated hammers each pivotally mounted at one end to said carriage, the opposite end of each of said hammers disposed in a row, means mounted on said head for supporting each of said hammers intermediate its ends, a plurality of solenoids mounted on said head each including a coil and an armature, means coupling each of said solenoid armatures with a respective hammer, means for selectively energizing different combinations of said solenoid coils, said last named means adapted to actuate different combinations of said coupled armatures and hammers for driving selected interposers in one row thereof into said blocking position, and means effecting incremental translation of said carriage so that said hammers are positioned successively adjacent each of said rows of interposers.

21. In a perforating head of the type including a plurality of rows of punches and a plurality of rows of interposers associated therewith, apparatus for selectively driving certain of said interposers into blocking position over their associated punches comprising, in combination, a carriage mounted on said head and translatable with respect thereto, a plurality of elongated hammers each pivotally mounted at one end to said carriage, the opposite end of each of said hammers disposed in a row, means mounted on said head for supporting said hammers intermediate their ends, power means mounted on said head coupled to said hammers, said power means adapted to selectively actuate different combinations of said hammers for driving selected interposers in one row thereof into said blocking position, and means effecting incremental translation of said carriage so that said hammers are positioned successively adjacent each of said rows of interposers.

22. In a perforating head of the type including a plurality of rows of punches and a plurality of rows of interposers associated therewith, apparatus for selectively driving certain of said interposers forward into blocking position over their associated punches comprising, in combination, a carriage mounted on said head and translatable with respect thereto, a row of hammers pivotally mounted on said carriage, power means mounted on said head coupled to said hammers, said power means adapted to selectively actuate different combinations of said hammers for driving selected interposers in one row thereof forward into said blocking position, stop means mounted on said head for limiting the forward movement of each of said interposers, means effecting incremental translation of said carriage so that said hammers are positioned successively adjacent each of said rows of interposers, rake means extending transversely through said head and through each of said interposers for simultaneously returning each of the interposers driven into blocking position to their starting positions upon completion of a perforation operation, and means for selectively disabling said rake means.

23. In a perforating head of the type including a plurality of punches arranged in a plurality of rows, a plurality of blocking interposers arranged in a plurality of rows, and a row of hammers for selectively driving certain of said interposers into blocking position over their associated punches, the combination comprising, a carriage mounted on said head and translatable with respect thereto for supporting said hammers, first biasing means urging said carriage in one direction, stop means mounted on said head coupled with said carriage, second biasing means adapted to yieldingly urge said stop means into engagement with said carriage for locking said carriage in a fixed position with said row of hammers adjacent one row of said interposers, power means mounted on said head for selectively actuating different combinations of said hammers so as to drive selected interposers in said row into blocking position, and means for momentarily overcoming said second yieldable biasing means so as to disengage said stop means from said carriage, said second biasing means adapted to re-engage said stop means with said carriage when said first biasing means has effected translation of said carriage to a position where said row of hammers is in proximity to the adjacent row of interposers.

24. In a perforating head of the type including a plurality of punches, a plurality of blocking interposers and a hammer for selectively positioning certain of said interposers over their associated punches in a blocking position, the combination comprising, a carriage mounted on said head and translatable with respect thereto for supporting said hammer, escapement teeth formed on said carriage, first biasing means urging said carriage in one direction, an escapement pawl pivotally mounted on said head, second biasing means yieldingly urging said pawl into engagement with said escapement teeth for locking said carriage in a fixed position with said hammer adjacent one of said interposers, power means for actuating said hammer so as to drive said one interposer into blocking position, and means for momentarily pivoting said pawl against said second yieldable biasing means so as to disengage said pawl from said escapement teeth, said second biasing means adapted to re-engage said pawl with said escapement teeth when said first biasing means has effected translation of said carriage an increment defined by the pitch of said escapement teeth.

25. In a perforating head of the type including a plurality of punches arranged in a plurality of rows, a plurality of blocking interposers arranged in a plurality of rows, and a row of hammers for selectively driving certain of said interposers into a blocking position over their associated punches, the combination comprising, a carriage mounted on said head and translatable with respect thereto for supporting said hammers, escapement teeth formed on said carriage, first biasing means urging said carriage in one direction, an escapement pawl pivotally mounted on said head, second biasing means yieldingly urging said pawl into engagement with said escapement teeth for locking said carriage in a fixed position with said row of hammers adjacent one row of said interposers, power means mounted on said head for selectively actuating different combinations of said hammers so as to drive selected interposers in said one row into blocking position, and means for momentarily pivoting said pawl against said second yieldable biasing means so as to disengage said pawl from said escapement teeth, said second biasing means adapted to re-engage said pawl with said escapement teeth when said first biasing means has effected translation of said carriage an increment defined by the pitch of said teeth.

26. In a perforating head of the type including a plurality of punches arranged in a plurality of rows, a plurality of blocking interposers arranged in a plurality of rows, and a plurality of elongated hammers for selectively driving certain of said interposers into a blocking position over their associated punches, the combination comprising, a carriage mounted on said head and translatable with respect thereto, said plurality of hammers pivotally mounted at one end to said carriage, the opposite end of each of said hammers disposed in a row adjacent one of said plurality of rows of interposers, escapement teeth formed on said carriage, first biasing means urging said carriage in one direction, an escapement pawl pivotally mounted on said head, second biasing means yieldingly urging said pawl into engagement with said escapement teeth for locking said carriage in a fixed position with said row of elongated hammers adjacent one of said rows of interposers, a plurality of solenoids mounted on said head each including a coil and an armature, each of said solenoid armatures coupled to a different one of said hammers, means for selectively energizing different combinations of said solenoid coils, said last named means adapted to actuate certain of said coupled armatures and hammers so as to drive the associated interposers into blocking position, and means for momentarily pivoting said pawl against said second yieldable biasing means so as to disengage said pawl from said escapement teeth, said second biasing means adapted to re-engage said pawl with said escapement teeth when said first biasing means has effected translation of said carriage an increment defined by the pitch of said teeth.

27. For use in a perforation machine of the type employing a movable head adapted to drive a selected combination of punches disposed in a plurality of adjacent rows through an article to form a plurality of characters, the combination comprising, a plurality of rows of independently movable blocking interposers mounted on said head, means for selectively positioning cerain of said interposers in each row in blocking position over their associated punches including a carriage mounted on said head and translatable with respect thereto, a row of interposer actuators mounted on said carriage and positioned in proximity to one of said rows of interposers, selectively operable power means adapted to independently urge certain of said actuators into engagement with the adjacent interposers for moving said interposers into blocking position, escapement means effecting incremental movement of said carriage for selectively positioning said row of actuators adjacent each row of interposers successively, means effecting downward movement of said head to drive said blocked punches through said article, and means for automatically returning said row of actuators to a position adjacent any desired row of interposers.

28. For use in a perforation machine of the type employing a base and a head movable relative thereto adapted to drive a selected combination of punches disposed in a plurality of adjacent rows through an article to form a plurality of characters, the combination comprising, a plurality of rows of independently movable blocking interposers mounted on said head, means for selectively positioning certain of said interposers in each row in blocking position over their associated punches including a carriage mounted on said head and translatable with respect thereto, a row of interposer actuators mounted on said carriage and positioned in proximity to one of said rows of interposers, selectively operable power means adapted to independently urge certain of said actuators into engagement with the adjacent interposers for moving said interposers into blocking position, escapement means effecting incremental movement of said carriage for selectively positioning said row of actuators adjacent each row of interposers successively, means effecting relative movement of said head towards said base to drive said blocked punches through said article, an adjustable stop mounted on said base, and means mounted on said head forming a lost motion connection between said carriage and said adjustable stop for returning said row of actuators to a position adjacent any desired row of interposers during relative movement of said head towards said base.

29. For use in a perforation machine of the type employing a base and a head movable relative thereto adapted to drive a selected combination of punches disposed in a plurality of adjacent rows through an article to form a plurality of characters therein, the combination comprising, a plurality of rows of independently movable blocking interposers mounted on said head, means for selectively positioning certain of said interposers in each row in blocking position over their associated punches including a carriage mounted on said head and translatable with respect thereto, a row of interposer actuators mounted on said carriage and positioned in proximity to one of said rows of interposers, selectively operable power means adapted to independently urge certain of said actuators into engagement with the adjacent interposers for moving said interposers into blocking position, escapement means effecting incremental movement of said carriage for selectively positioning said row of actuators adjacent each row of interposers successively, means effecting relative movement of said head towards said base to drive said blocked punches through said article, and means for automatically returning said row of actuators to a position adjacent any desired row of interposers, said last named means including an adjustable stop mounted on said base and a substantially L-shaped link pivotally mounted on said head, said link having a first arm coupled to said carriage and a second arm positioned to overlie said adjustable stop whereupon downward movement of said head and said second arm engages said adjustable stop.

30. In a perforation machine of the type employing a plurality of blocking interposers each carried by a perforating head with freedom for independent end-wise movement into blocking position over an associated perforating punch, the combination comprising, a base, means mounting said head on said base for relative movement towards and away from said base, rake means carried by said head and translatable with respect thereto, said rake means extending loosely through each of said blocking interposers, power means effecting relative movement of said head towards and away from said base, a linkage defining a lost motion connection interconnecting said rake means and said power means during relative movement of said head away from said base for translating said rake means rearwardly with respect to said head, and means for selectively disabling said lost motion connection.

31. In a perforation machine of the type employing a plurality of blocking interposers each carried by a perforating head with freedom for independent end-wise movement into blocking position over an associated perforating punch, the combination comprising, a base, means mounting said head on said base for relative movement towards and away from said base, a rake plate carried by said head and translatable with respect thereto, a plurality of rake finger integral with said plate and extending loosely through each of said blocking interposers, power means affecting relative movement of said head towards and away from said base, a linkage defining a lost motion connection interconnecting said rake plate and said power means during relative movement of said head away from said base for translating said rake plate rearwardly with respect to said head, said linkage coupled at one end with said rake plate, means defining a selectively floatable pivotal coupling between said base and the other end of said linkage, and means for retracting said floatable pivotal coupling, said last named means adapted to disable said lost motion connection.

32. In a perforation machine of the type employing a plurality of blocking interposers each carried by a perforating head with freedom for independent end-wise movement into blocking position over an associated perforating punch, the combination comprising, a base, means mounting said head on said base for relative movement towards and away from said base, rake means carried by said head and translatable with respect thereto, said rake means extending loosely through each of said blocking interposers, an eccentric drive shaft for effecting relative movement of said head towards and away from said base, control means mounted on said base including a selectively floatable pivot, a floating lever connected at one end to said pivot and coupled at its other end to said rake means, a cam follower formed on said lever, a cam coupled to said eccentric drive shaft and adapted to engage said cam follower and urge said lever rearwardly during relative movement of said head away from said base for translating said rake means rearwardly with respect to said head, and means selectively energizing said control means to lower said floating pivot so as to prevent engagement of said cam and said cam follower.

33. In a perforation machine of the type employing a plurality of blocking interposers each carried by a perforating head with freedom for independent end-wise movement into blocking position over an associated perforating punch, the combination comprising, a base, means mounting said head on said base for relative movement towards and away from said base, rake means carried by said head and translatable with respect thereto, said rake means extending loosely through each of said blocking interposers, an eccentric drive shaft, a pitman coupled to said drive shaft and said head for effecting relative movement of said head towards and away from said base, a cam mounted on said pitman, a solenoid having an armature and a coil mounted on said base, a floating lever pivotally connected at one end to said armature and coupled at the other end to said rake means, a cam follower formed on said lever, said cam adapted to engage said follower during the upstroke of said pitman for driving said lever rearwardly about its pivotal connection to said armature, and means for selectively energizing said coil to effect retraction of said lever whereupon said cam follower is spaced apart from said cam.

No references cited.